May 31, 1966  W. H. WENTLING ETAL  3,253,318
CENTRIFUGAL FAN MANUFACTURING
Filed Aug. 9, 1962  16 Sheets-Sheet 1
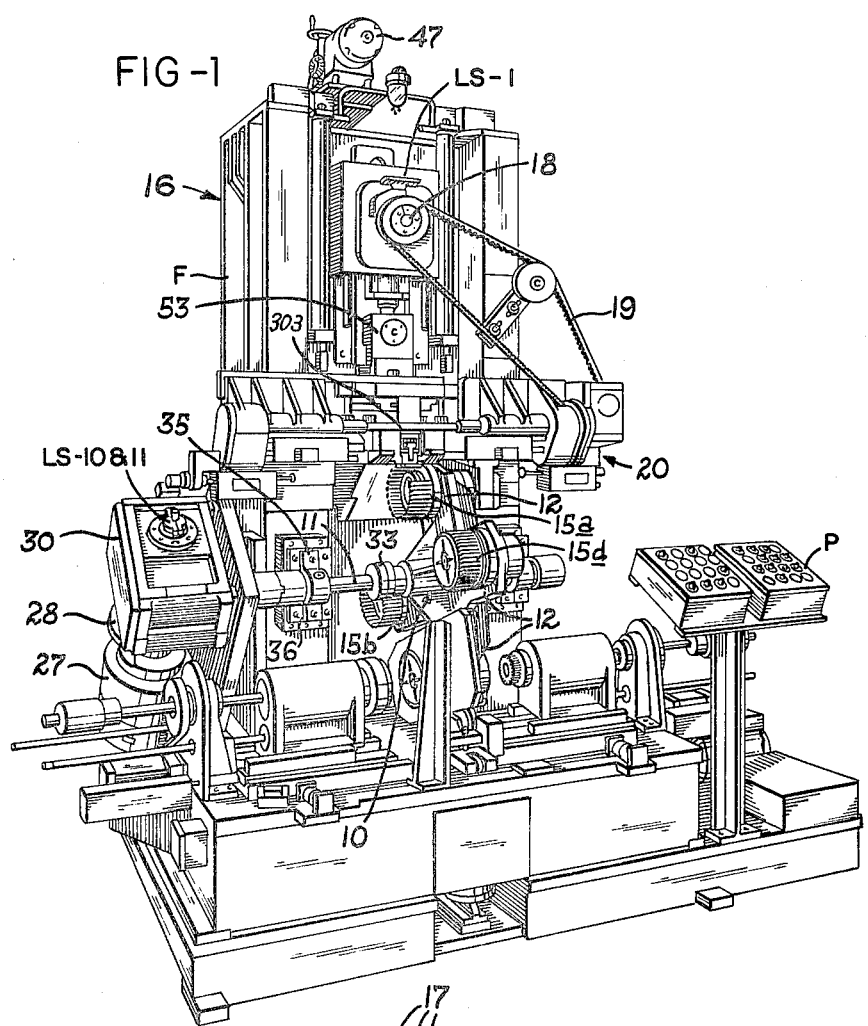
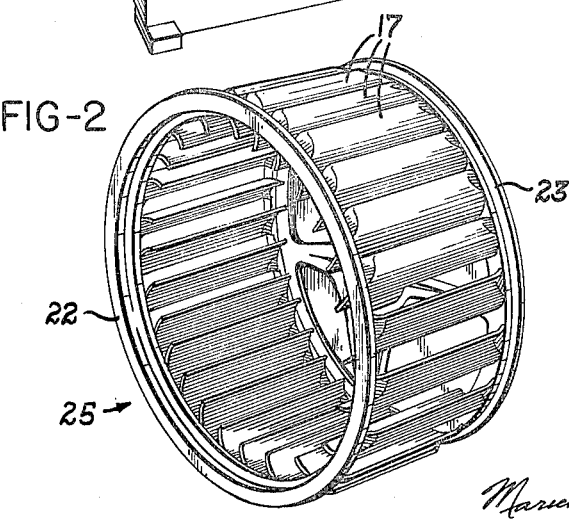
INVENTORS
WILLIAM H. WENTLING &
WILLIAM P. POWELL
BY
Marechal, Biebel, French & Bugg
ATTORNEYS

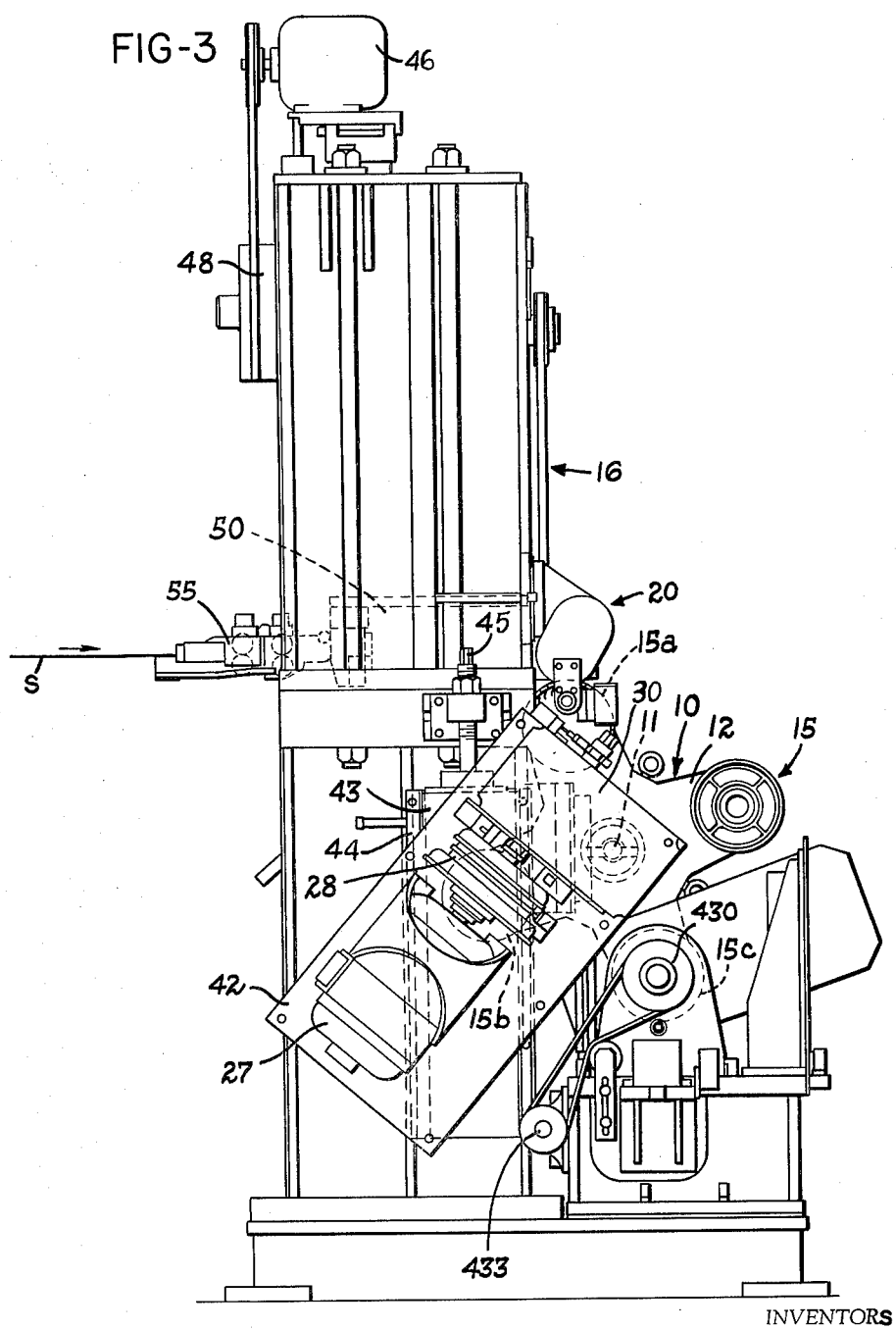

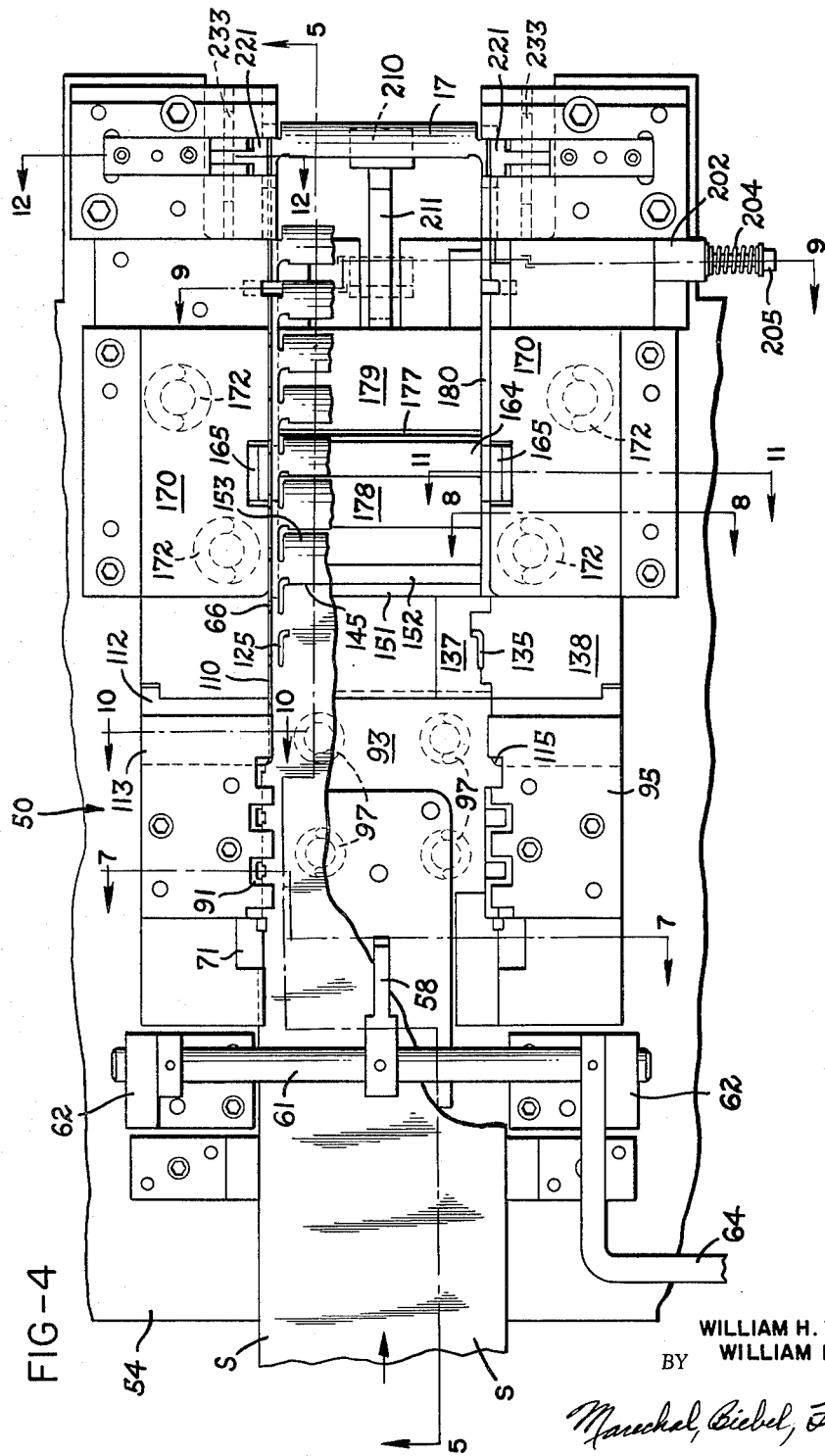

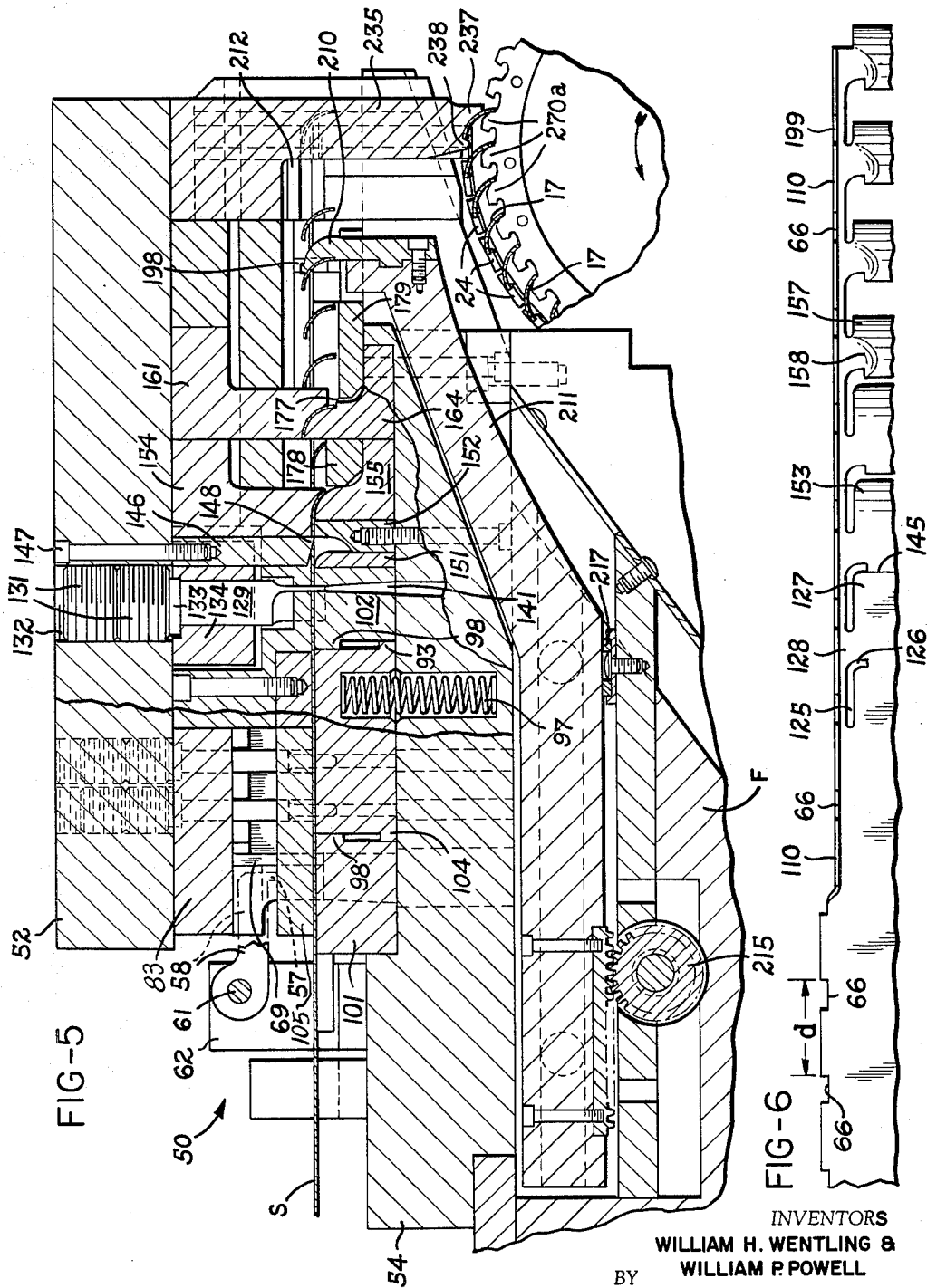

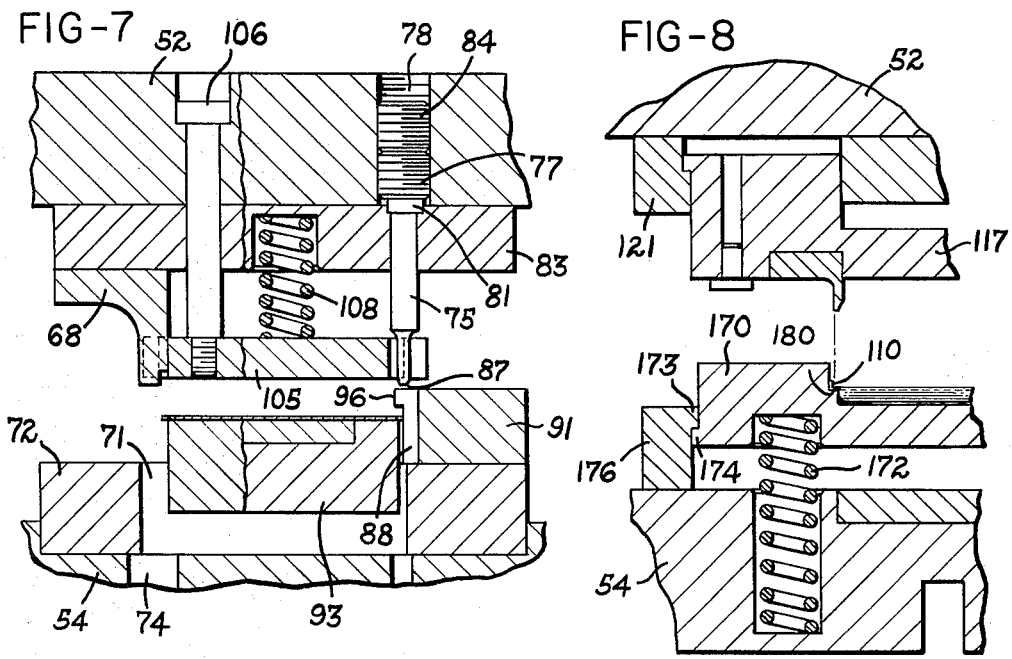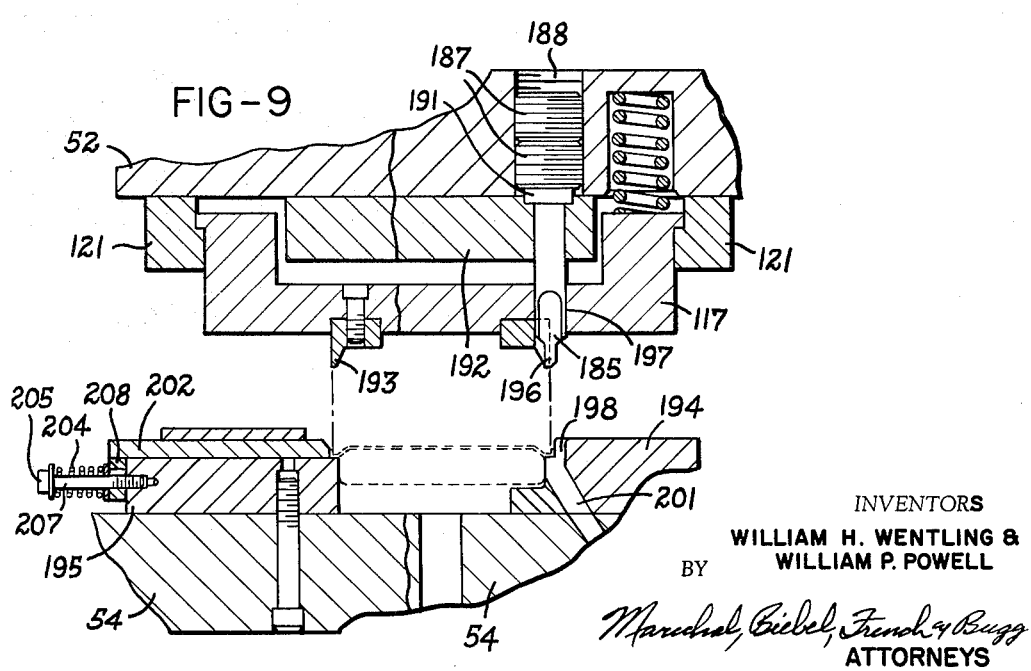

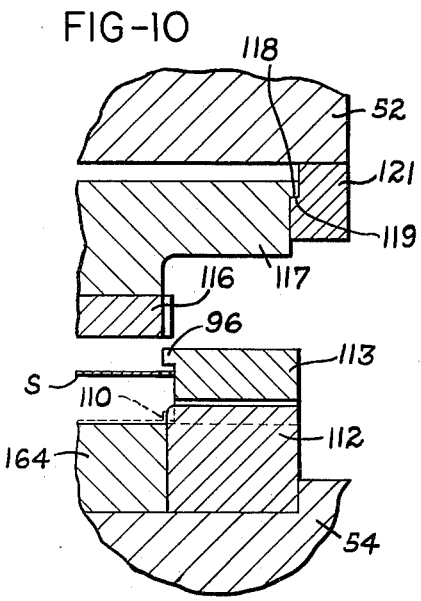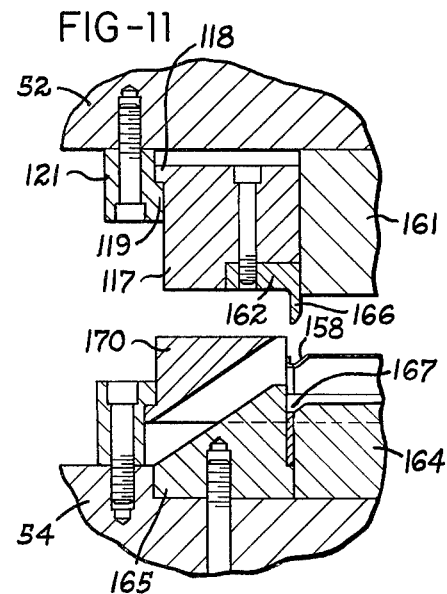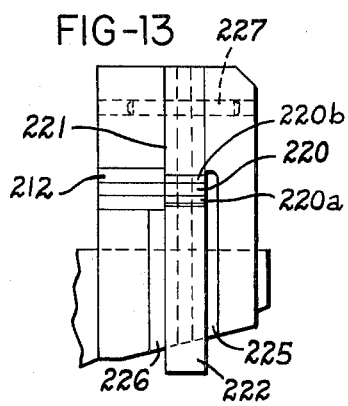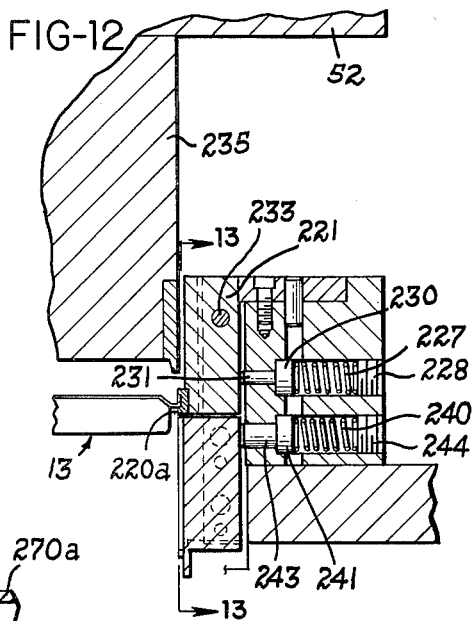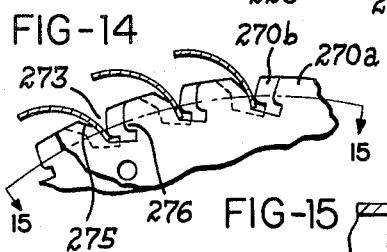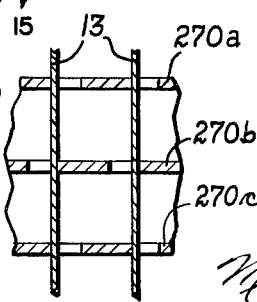

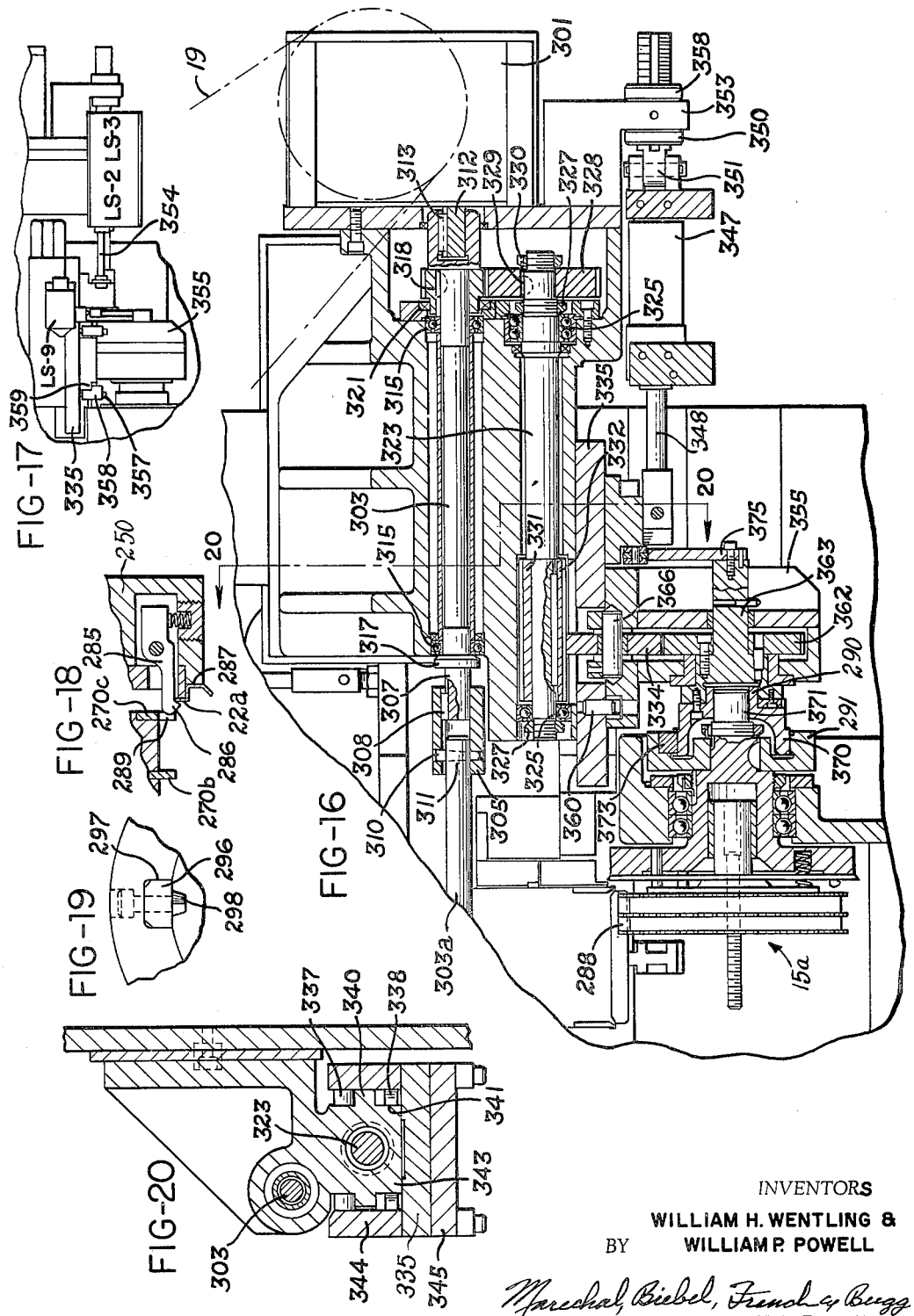

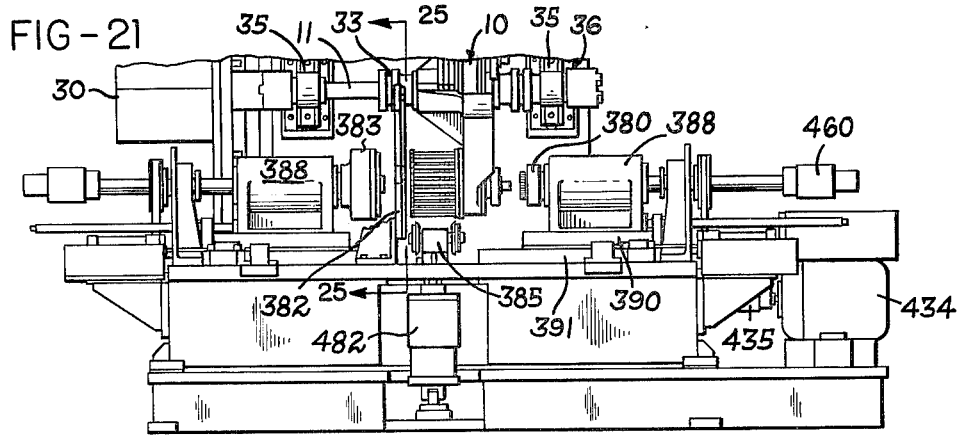
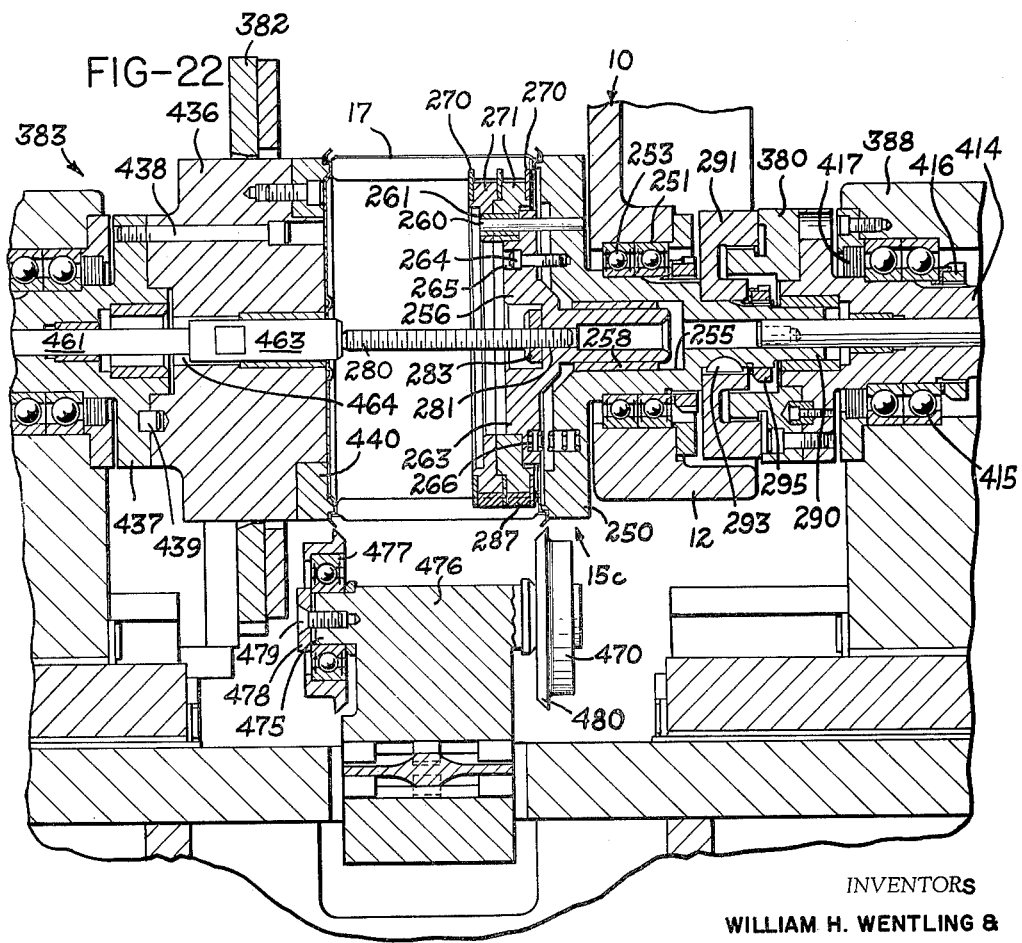

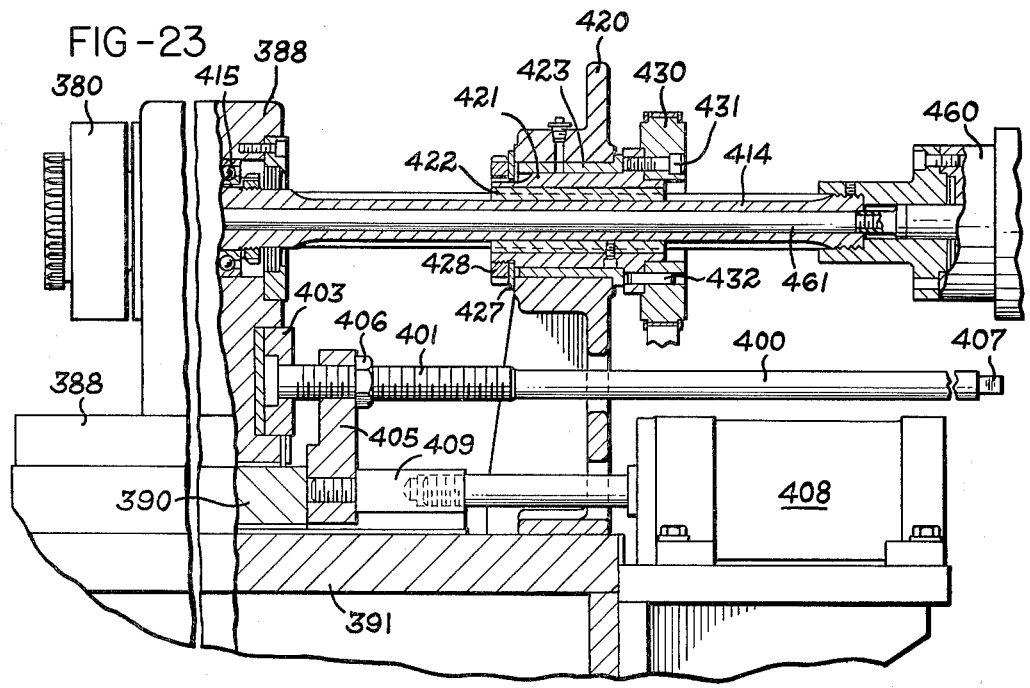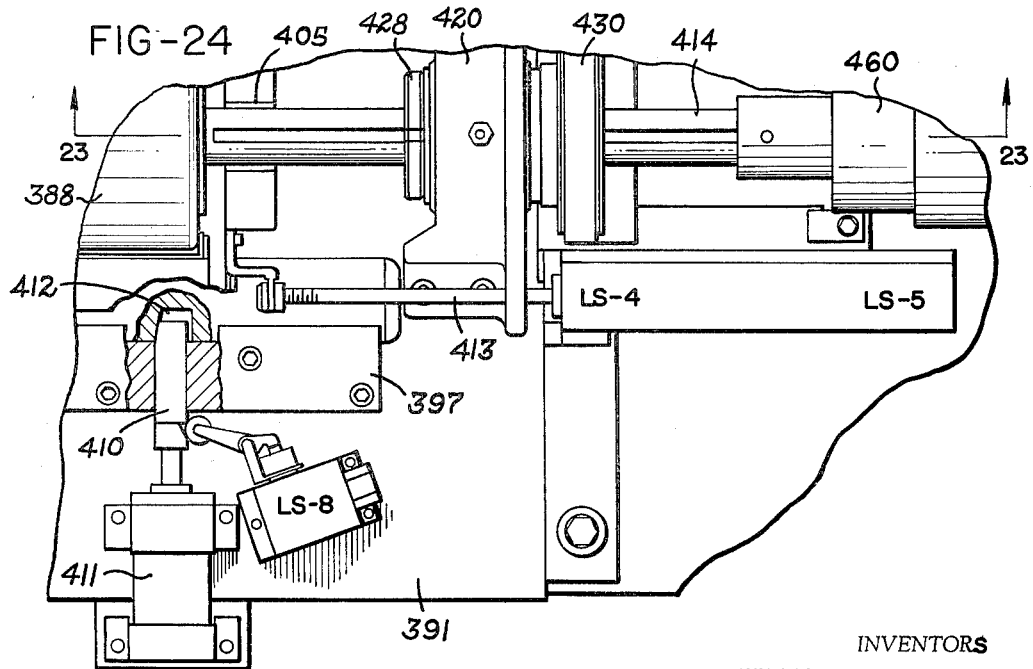

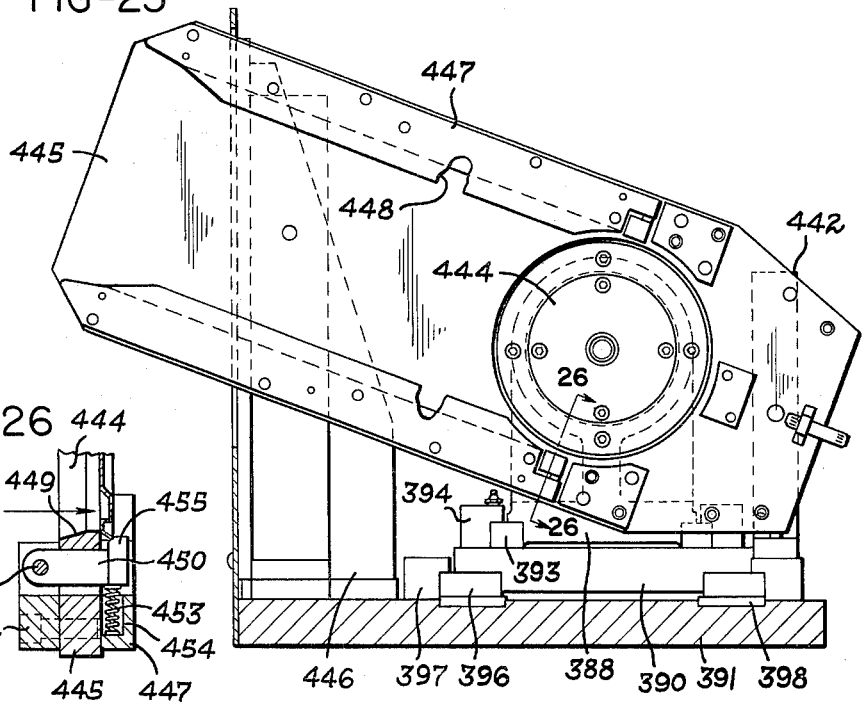
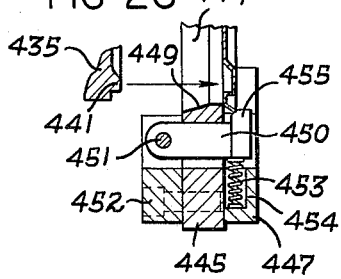
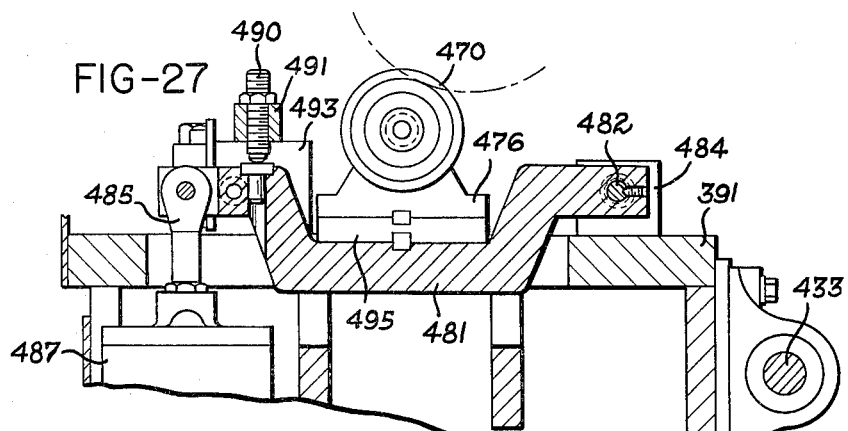
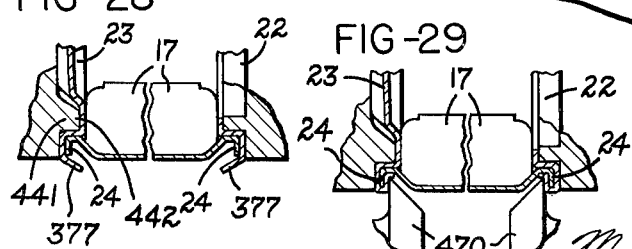
INVENTORS
WILLIAM H. WENTLING &
WILLIAM P. POWELL
ATTORNEYS

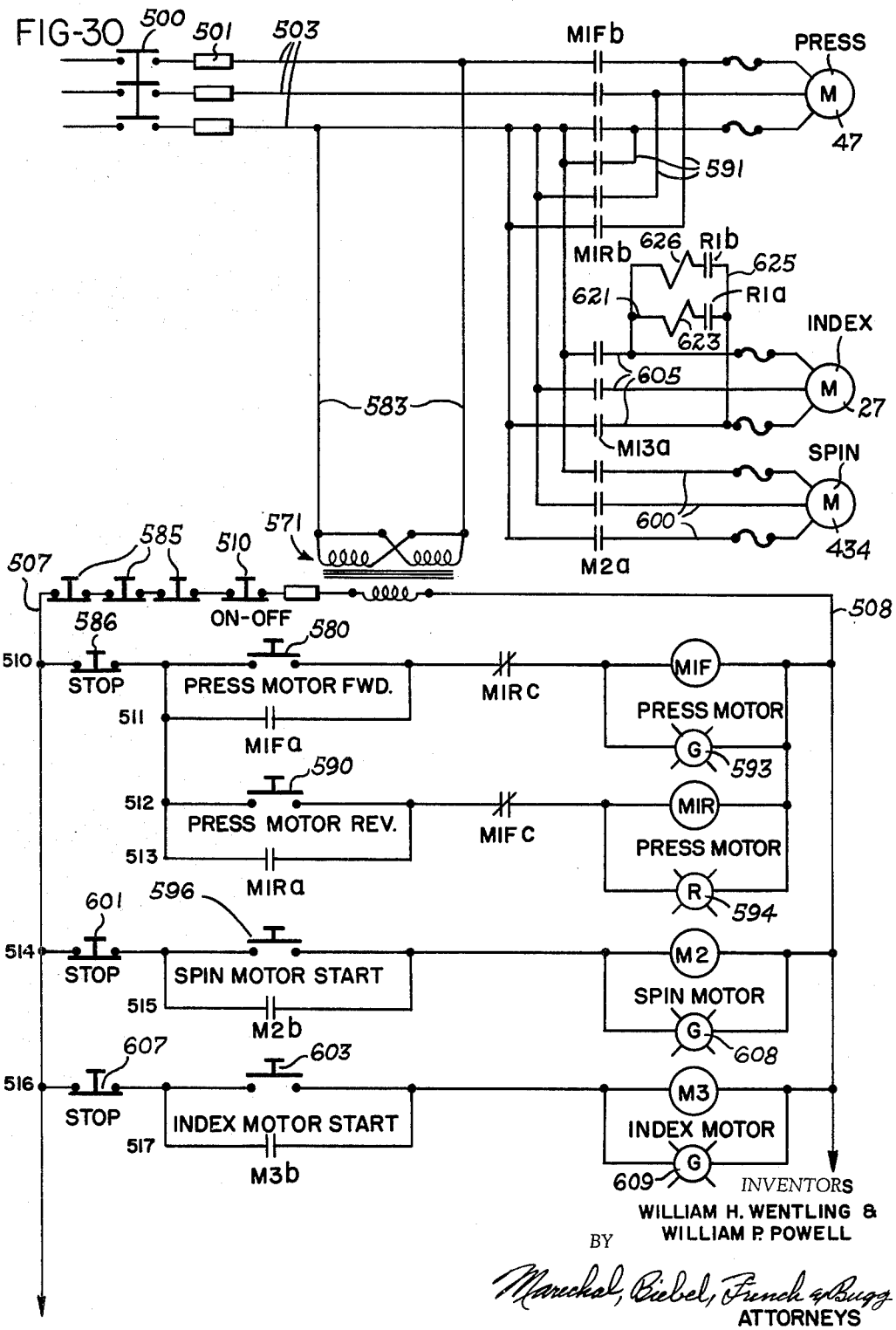

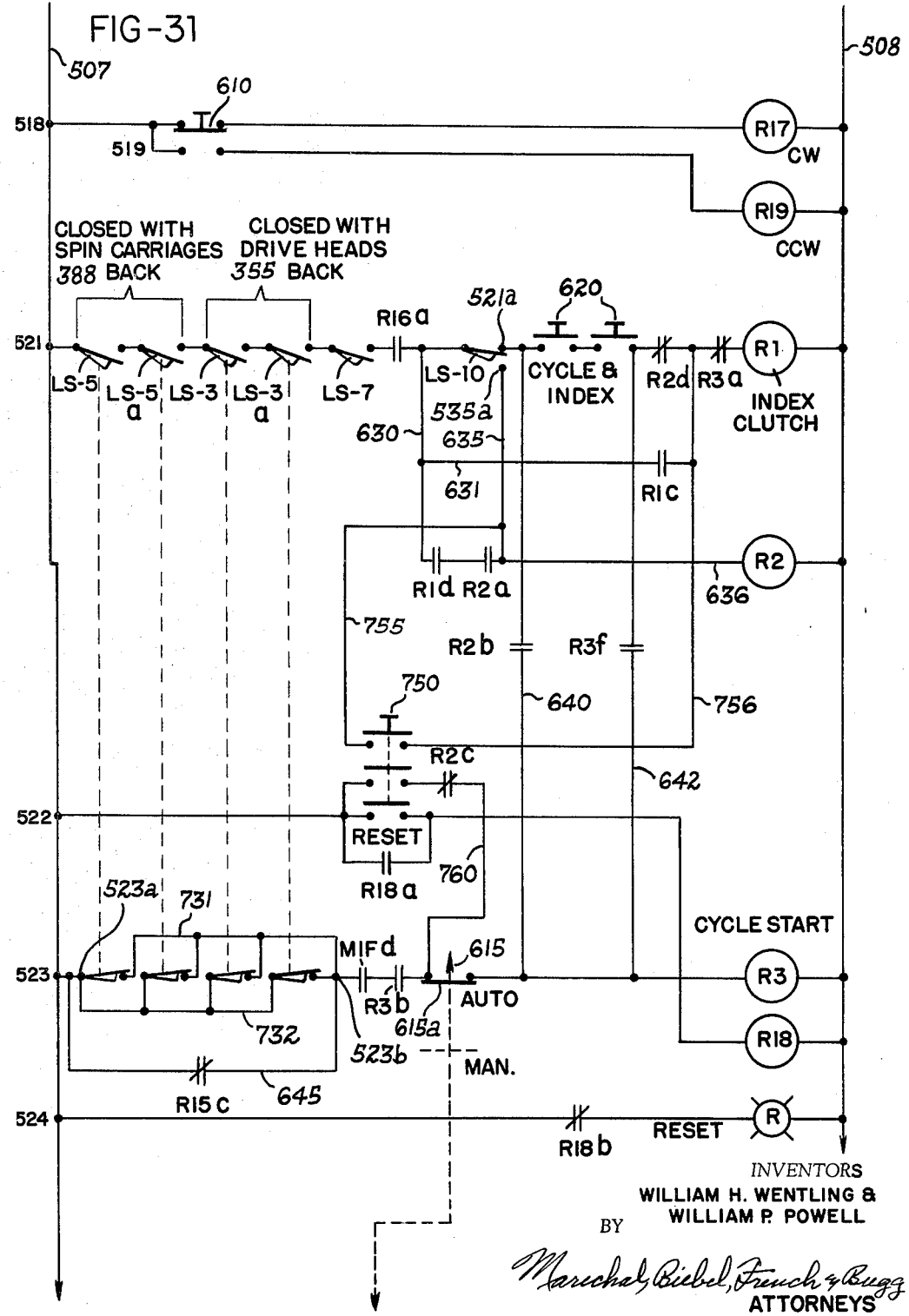

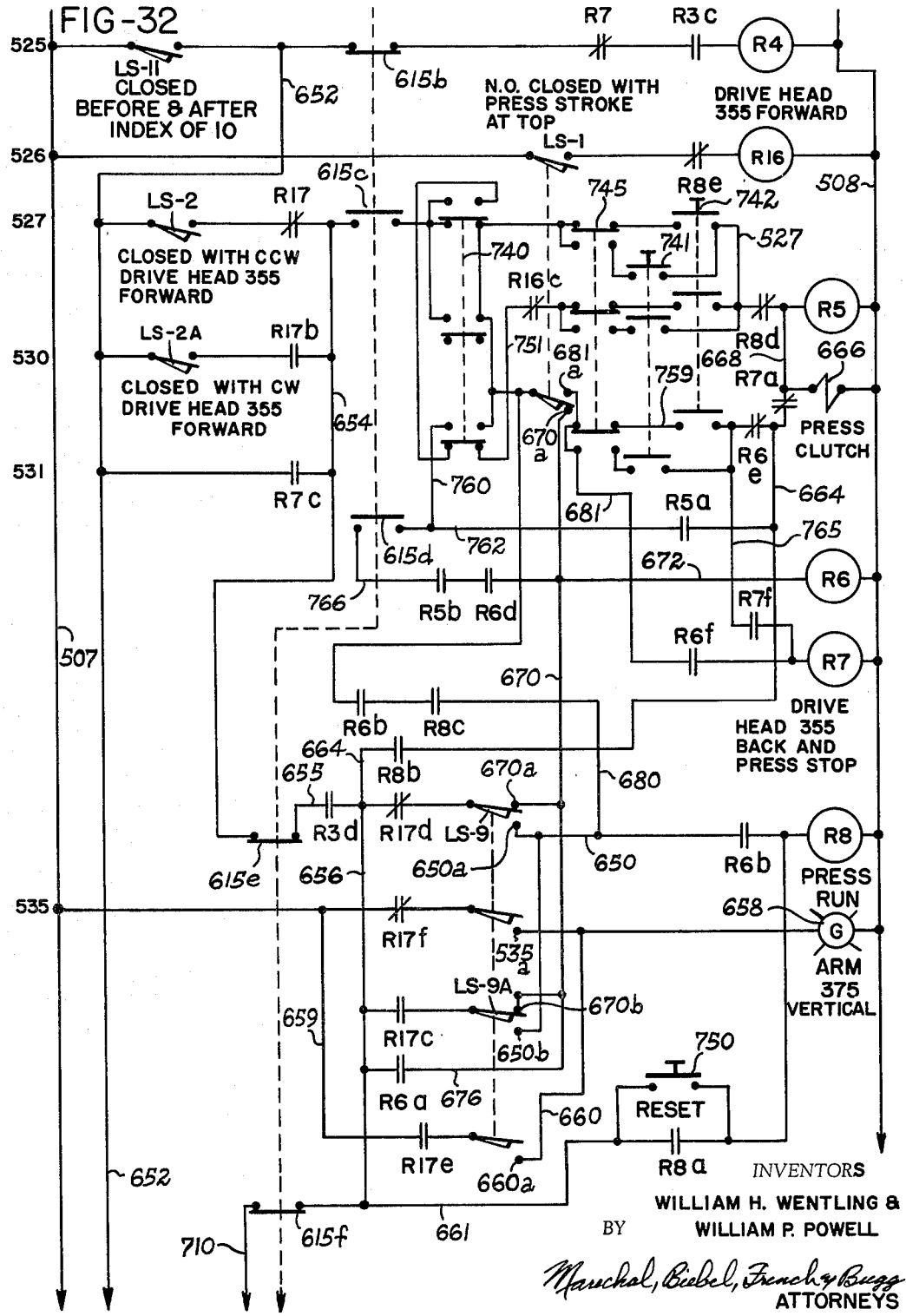

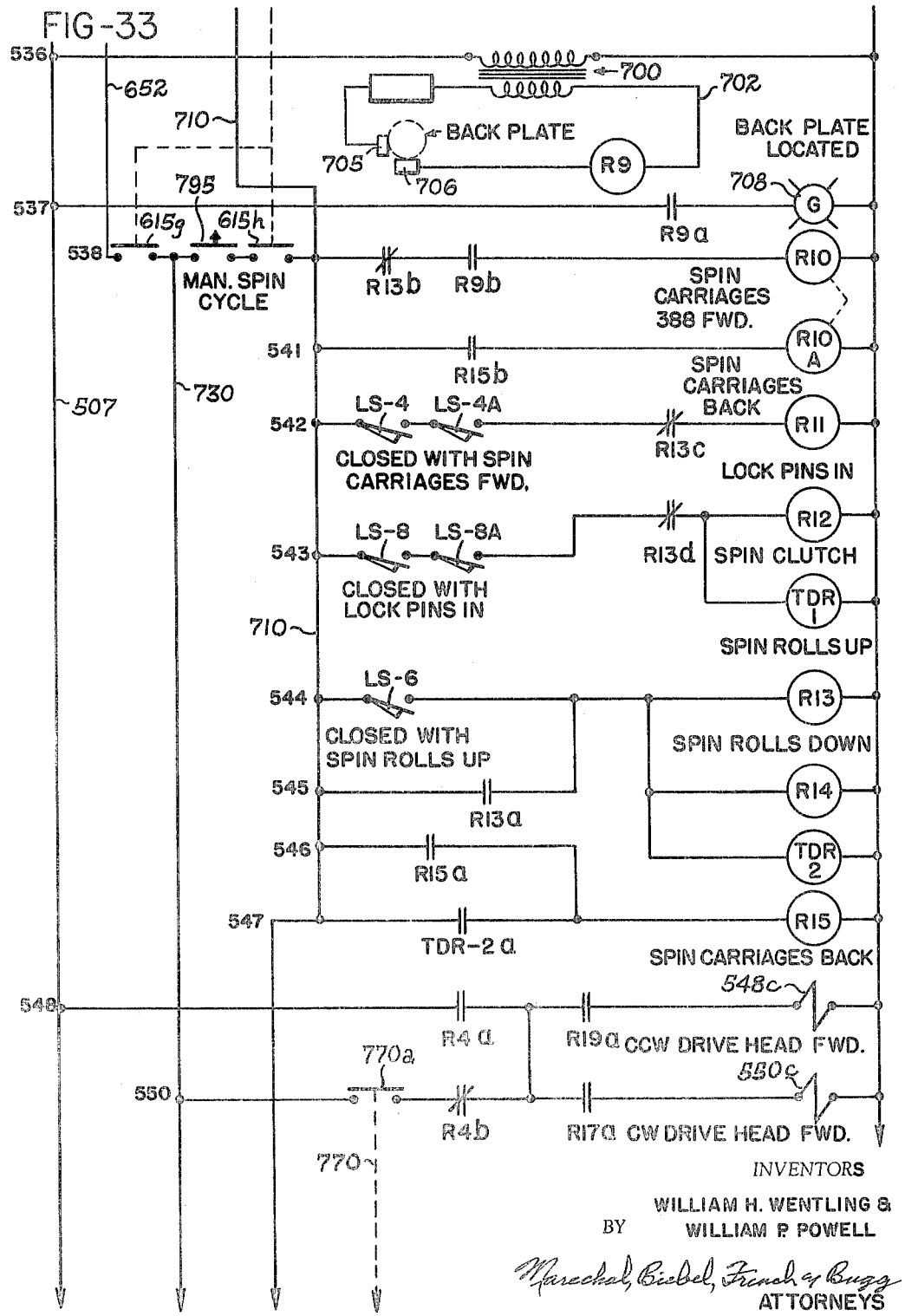

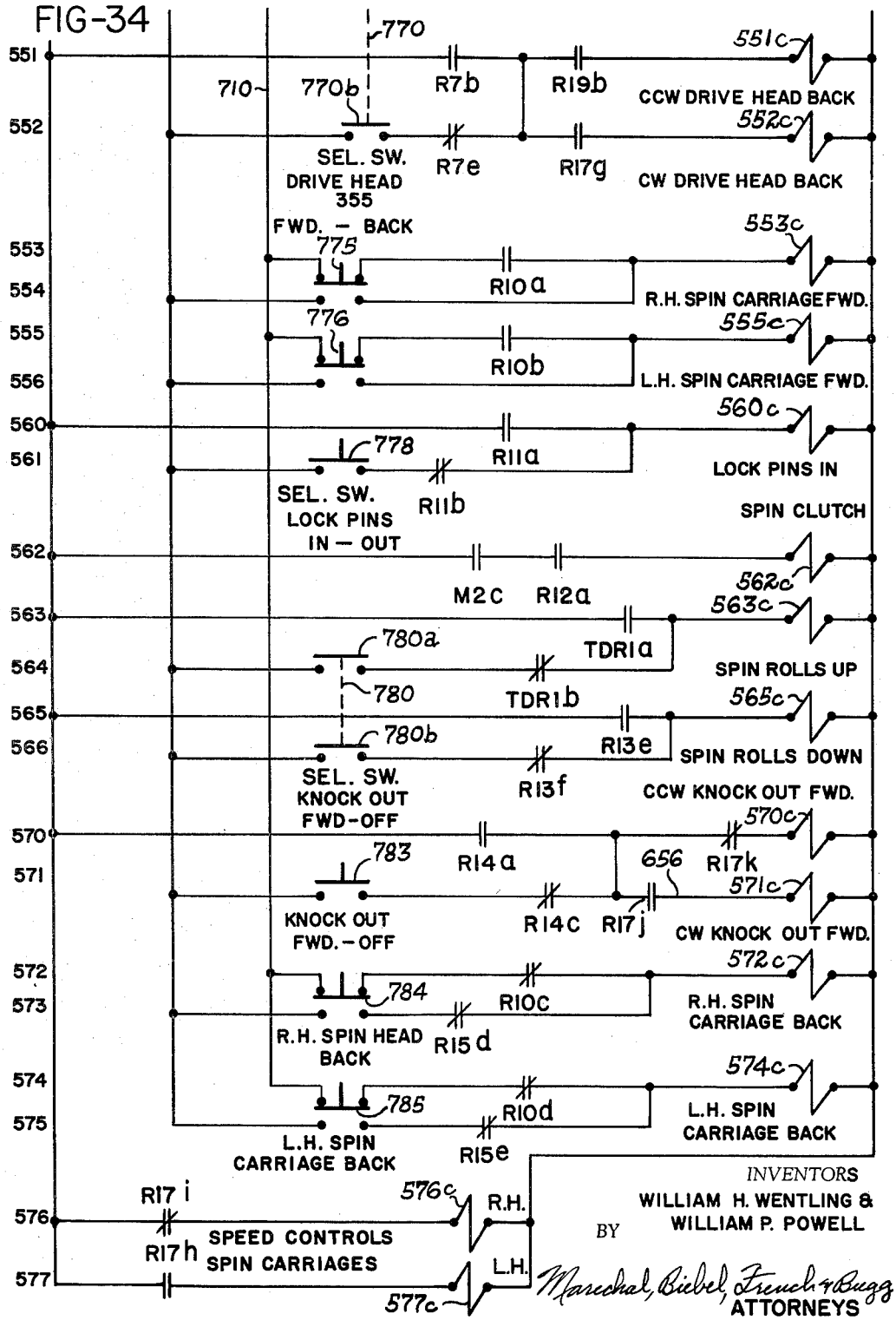

May 31, 1966    W. H. WENTLING ETAL    3,253,318
CENTRIFUGAL FAN MANUFACTURING
Filed Aug. 9, 1962    16 Sheets-Sheet 16

INCH POS.    TOP STOP POS.    ONCE POS.

INVENTORS
WILLIAM H. WENTLING &
BY   WILLIAM P. POWELL
Marechal, Biebel, French & Bugg
ATTORNEYS

United States Patent Office 3,253,318
Patented May 31, 1966

3,253,318
CENTRIFUGAL FAN MANUFACTURING
William H. Wentling and William P. Powell, Dayton, Ohio, assignors to The Lau Blower Company, Dayton, Ohio, a corporation of Ohio
Filed Aug. 9, 1962, Ser. No. 215,988
16 Claims. (Cl. 29—23.5)

This invention relates to multiblade centrifugal fans of the type commonly known as blowers, and to rotors or blower wheels therefor.

More particularly, this invention concerns a new centrifugal blower wheel and the automatic manufacture thereof, which includes the production of individual blades, the mounting of these blades on a fixture in a predetermined relationship corresponding to their relative positioning in the blower wheel, and the securing of an end ring and back plate on opposite ends of these blades while on the fixture thus forming a finished blower wheel. The apparatus or machinery which performs the above operations is also capable of manufacturing blower wheels having different diameters, number of blades and blade lengths, as well as blower wheels for clockwise and counterclockwise rotation while requiring a relatively small amount of time and attention by a single operator. In addition, this machine permits a wide selection of materials from which the blower wheel components are formed.

An important object of this invention is to provide methods and apparatus for automatically manufacturing centrifugal blower wheels, and specifically for the automatic production of blower wheels having varying diameters, number of blades, blade lengths and configurations, as well as blower wheels which rotate in a clockwise or counterclockwise direction.

Another object of the invention is to provide a method and apparatus for completely and automatically producing blower wheels from sheet metal, and particularly to provide such a method and apparatus which will simultaneously perform operations on a number of blower wheels so that the rate of production is increased above that generally known throughout the prior art.

A further object of the invention is to provide apparatus for producing finished blower wheels from metal stock, and particularly to provide apparatus of this type which includes a control system for complete automatic operation requiring a minimum of attention from the operator, or which can be adapted for manual operation wherein the operator must manually initiate each operation of the machine.

A further object of the invention is to provide a fixture which receives, holds, and aligns a plurality of blower wheel blades in a predetermined position corresponding to their position in a blower wheel, and which is adapted to facilitate the automatic placement of the end ring and back plate on the ends of the aligned blades.

A still further object of the invention is to provide a method and apparatus for forming individual blower wheel blades having complex curved surfaces thereon from various types of material, including steel and aluminum, by progressively forming the blade curves and other blade components.

It is a further object of the invention to provide methods and apparatus for automatically fabricating blower wheels wherein the individual blades are successively formed, assembled and held in a desired circumferential alignment about a central axis, and then an end ring and a back plate are secured to opposite ends thereof thus producing finished blower wheels without requiring more than cursory attention from the operator.

Another object of the invention is to provide an improved blower wheel which is simple and economical in construction, which can be made at less expense than wheels heretofore available, which has individual blades shaped to develop the most desirable performance and air delivery, and which is of high strength and rigidity and capable of operating with freedom from objectionable vibration and noise at high speeds.

It is a further object to provide a blower wheel comprised of a plurality of separate blades which are assembled and securely held in proper operative position without the use of any heating operation making possible the use of blades which have been galvanized or otherwise surface treated, and further enabling the use of non-metallic blade materials where desired, and particularly to provide blowers of this type which have superior strength, stiffness, and concentricity.

Other objects and advantages of the invention will be apparent from the following description, the accompanying drawings and the appended claims.

In the drawings—

FIG. 1 is a view in perspective illustrating apparatus for producing counterclockwise blower wheels in accordance with the invention;

FIG. 2 is a perspective view of a clockwise blower wheel which can be produced by the apparatus shown essentially in FIG. 1;

FIG. 3 is a side elevational view of the apparatus shown in FIG. 1;

FIG. 4 is a plan view of a portion of the die mechanism with the top die shoe removed and the metal stock partially broken away;

FIG. 5 is a sectional view through the die taken essentially along the line 5—5 of FIG. 4, including a showing of the top die shoe;

FIG. 6 is a slightly enlarged fragmentary view of the metal stock illustrating the various steps which are performed thereon as it progresses through the die;

FIG. 7 is a sectional view essentially along the line 7—7 of FIG. 4 and showing the top die shoe in a raised position;

FIGS. 8 through 12 are sectional views similar to FIG. 7 taken along the lines 8—8 through 12—12, respectively, of FIG. 4 and showing the top die shoe in its raised position;

FIG. 13 is a view along the view line 13—13 of FIG. 12;

FIG. 14 is a fragmentary view illustrating the manner in which the individual blades are secured on the index heads;

FIG. 15 is a section essentially along the line 15—15 of FIG. 14 further illustrating the manner in which the blades are secured on the index heads;

FIG. 16 is a section through the index head drive mechanism;

FIG. 17 is a showing of the exterior structure of the index head drive mechanism;

FIG. 18 is a fragmentary sectional view of one of the latches which are utilized to secure the end rings on the index heads;

FIG. 19 is a fragmentary view of the drive keys on the index heads;

FIG. 20 is a sectional view taken essentially along the line 20—20 of FIG. 16;

FIG. 21 is an elevational view of the lower portion of the machine shown in FIGS. 1 and 3 illustrating the spinning mechanism;

FIG. 22 is an enlarged sectional view of a portion of the spinning mechanism showing the spin carriages in their advanced position;

FIG. 23 is a view, partially in elevation and partially in section, of one side of the spinning mechanism with the section being taken along the line 23—23 of FIG. 24;

FIG. 24 is an enlarged plan view of a portion of the spinning mechanism;

FIG. 25 is an elevational view looking generally along the view line 25—25 of FIG. 21;

FIG. 26 is an enlarged fragmentary sectional view of the latch mechanism which engages the back plate in the back plate guide;

FIG. 27 is an enlarged view partially in section and partially in elevation of the spin roll actuating mechanism;

FIGS. 28 and 29 are enlarged sectional views illustrating the end ring and back plate before and after the spinning operation;

FIGS. 30 through 35 are schematic views of the electrical control system; and

Figure 36:
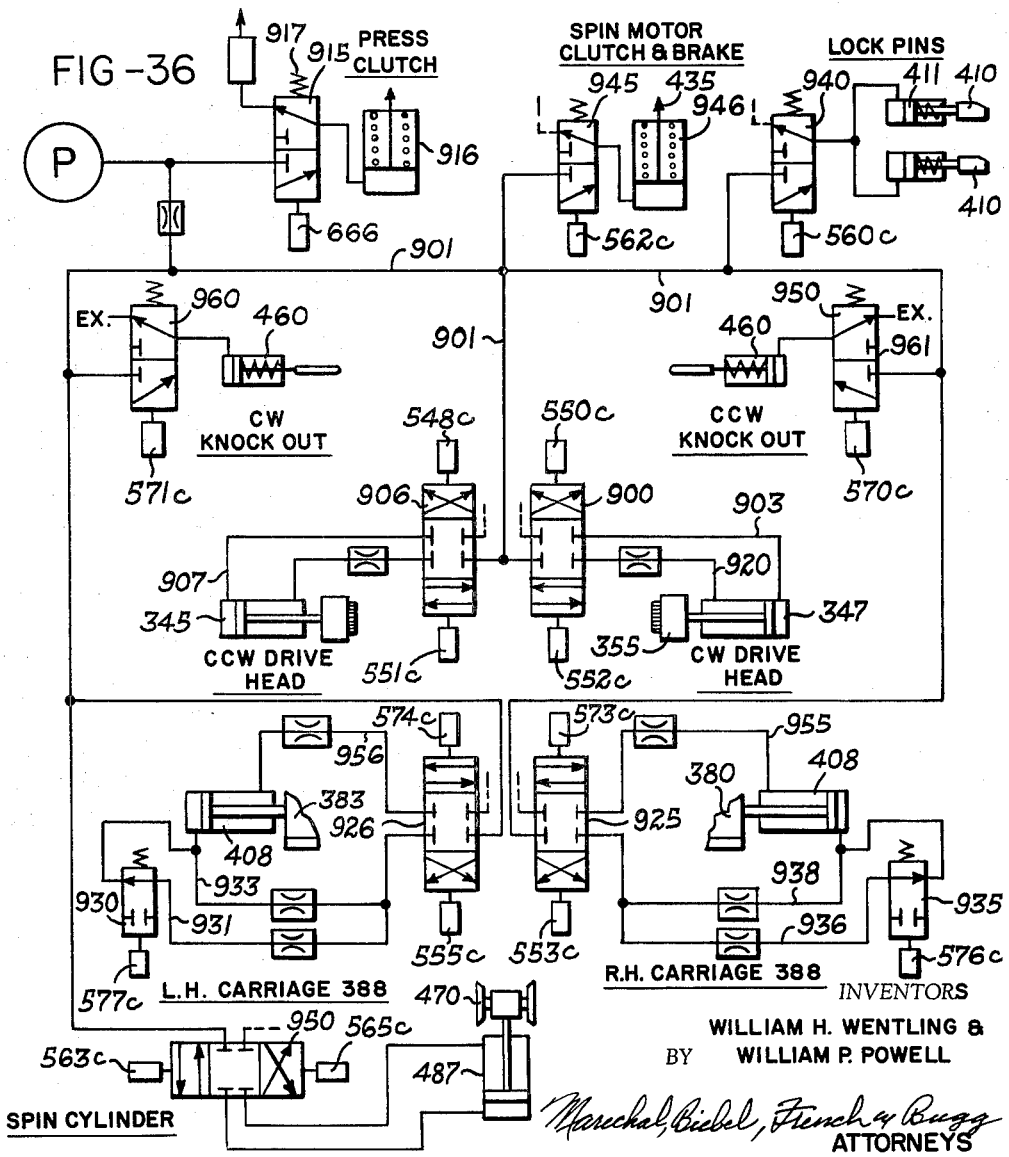

FIG. 36 is a schematic view of the fluid control circuitry.

*General description*

Referring to the drawings, which illustrate a preferred embodiment of the invention, FIG. 1 shows a blower wheel making apparatus or machine including a ferris wheel 10 mounted for rotation on the drive shaft 11, and having four radially extending arms 12 each with an index head 15 thereon. The ferris wheel 10 sequentially moves each of the index heads 15 through a series of stations wherein the various components of the machine cooperate therewith to perform the steps in the making of a blower wheel (FIG. 2). As will be seen, the machine simultaneously performs operations on a number of blower wheels, and produces a finished blower wheel for each one quarter revolution of the ferris wheel 10. It is pointed out that the index heads 15 are identical and the lower case letters *a* through *d* are suffixed thereto solely for indicating the stations at which they have been positioned by the ferris wheel 10.

Thus, tracing the production of one blower wheel through the machine, the index head 15a is shown positioned at the blade receiving station for cooperation with the press 16 which is suitably mounted in the upper portion of the machine frame F for operating a die which receives a strip of metal stock S (FIG. 3) through the rear of the machine and forms individual blower wheel blades 17 therefrom. As will be seen, these blades are automatically transferred to the index head 15a which receives and securely holds them in a predetermined spaced relationship corresponding to their relative positions in the finished blower wheel. While at the blade receiving station the index head 15a is driven from the crank shaft 18 of the press 16 through the timing belt 19 and the index head drive mechanism, indicated generally at 20, so that the rotation of the index head 15a is correlated with the operation of the press 16 thus properly aligning the index heads to receive each individual blade 17 as it is transferred from the press 16.

After the index head 15a receives the proper number of individual blades, the ferris wheel 10 is automatically rotated through 90° in a counterclockwise direction, as view in FIG. 3, so that the index head 15a will now be positioned at a dead station, indicated in FIG. 3 by the index head 15b. This station is provided primarily so that the three active stations may have more convenient locations, and therefore this station may be eliminated without departing from the scope of the invention. Such elimination would merely require the use of a ferris wheel having three equally spaced arms thereon and suitable changes in the location of the three active stations and their associated machine components.

The ferris wheel 10 is subsequently advanced another 90° so that the index head 15 is now at the spinning station, indicated by the index head 15c, wherein the end ring 22 and back plate 23 are spun over the flange 24 (FIG. 28) on each end of the individual blades 17 to produce a finshed blower wheel 25 (FIG. 2). Upon completion of the spinning operation the ferris wheel 10 is indexed once again to the operator's station, indicated by the index head 15d, wherein the operator removes the finished blower wheel 25 and places an end ring 22 on the index head 15d for use in the production of the next blower wheel. It should now be apparent that four blower wheels 25 are simultaneously in the process of being produced since there are four stations and four index heads 15 on the ferris wheel 10, and that for each revolution of the ferris wheel one blower wheel is produced.

The ferris wheel 10 is indexed or rotated between the aforesaid four stations by the motor 27 (FIG. 3) which drives the shaft 11 and the ferris wheel 10 through the clutch-brake unit 28 and the conventional Geneva motion unit 30. The clutch of unit 28 is provided since it is not feasible to bring the motor 27 up to speed each time the ferris wheel 10 is to be indexed, and the brake of this unit is engaged at all times except when the clutch is engaged so that the rotation of the ferris wheel 10 is substantially prohibited except when it is being indexed. As is well known, the Geneva motion drive unit 30 provides an output speed which is sinusoidal so that the speed of rotation gradually increases to a peak and then gradually decreases so that there is no sudden or jerking movement which might cause the positioning of the ferris wheel 10 to deviate from the aforesaid four stations.

The machine is capable of producing blower wheels having various diameters and blade lengths, as well as blower wheels for clockwise or counterclockwise rotation. (To determine whether a particular blower wheel is a clockwise or counterclockwise wheel, it is viewed in an axial direction from the external side of the back plate and the direction of rotation determined.) To illustrate the versatility of the machine, it has been shown as making a counterclockwise wheel whereas FIG. 2 illustrates a clockwise wheel. In changing the present machine from the production of counterclockwise to clockwise wheels, it is necessary to remove the ferris wheel 10 and replace it in a reversed manner so that the index heads 15 are changed from the left-hand to the right-hand side of the ferris wheel, as viewed in FIG. 1. Thus the detachable couplings 33 (FIG. 1) of a conventional type are provided in the drive shaft 11 on either side of the ferris wheel 10 so that the latter can be readily removed and reversed so replaced.

The capability of producing blower wheels 25 of varying diameters requires that a ferris wheel 10 having index heads 15 thereon, which correspond to the diameter of the blower wheel to be made, be provided for each diameter wheel that will be produced. The distance between the point at which the blades 17 enter the index head 15a and the axis of rotation of the index head 15c at the spinning station is the same in each of the ferris wheels 10 so that they can be easily interchanged on the machine with a minimum of set-up time. Since this distance is held constant and the outer diameter of the index heads 15 varies with the diameter of the blower wheel being produced, the axis of rotation of each ferris wheel 10 relative to the machine will be different for each diameter of blower wheel that is produced.

Thus the drive shaft 11 is mounted in the bearing blocks 35 which are vertically adjustable in the track members 36 secured to the machine frame F, and the mounting plate 42 (FIG. 3) having the motor 27, clutch-brake unit 28, and Geneva motion unit 30 thereon is secured to a carriage 43 which rides in suitable guide tracks 44 so that it can be raised or lowered by turning the screw 45 to effect vertical movement in the appropriate direction thereby easily adjusting the output of the Geneva motion unit 30 to accommodate the various positions of the drive shaft 11.

*Press and die mechanism*

The press 16, shown in FIGS. 3–12, is driven by the motor 46 through the press clutch 48, and operates the die mechanism 50 (hereinafter called "die") for producing the individual blades 17 from the metal stock S and for transferring these blades to the index head 15a. The die 50 includes a top die shoe 52 which is connected to and reciprocated by the ram 53 (FIG. 1) of the press 16 and a stationary bottom die shoe 54, each having a plurality of die steels thereon which mate with one another to produce an individual blade 17 each time the die shoes 52 and 54 are engaged.

The press 16 may be of any commercially avaliable design which is capable of fulfilling the herein described functional requirements, and apart from the combination does not constitute part of this invention. A conventional die feed mechanism 55 (FIG. 3) is provided for feeding the metal stock between the die shoes 52 and 54 at a predetermined rate each time the press 16 raises and lowers the top die shoe 52. For example, a suitable feed mechanism for this purpose which is commercially available is model "Dickerman 6 Inch Die Feed" sold by the H. E. Dickerson Manufacturing Company of Springfield, Massachusetts.

In setting up the machine the feed mechanism is disengaged, the press ram 53 is moved to its top dead center position and the leading edge of the metal stock S is inserted into the die 50 until it engages the projection 57 on the stop 58 (FIGS. 4 and 5) supported on the rod 61 which is journalled in the support blocks 62 on either side of the path of movement of the metal stock. Then the feed mechanism 55 is engaged so that metal stock is fed automatically into the die 50 in response to reciprocation of the press 16 from this point on. Specifically, for each stroke of the press 16 the metal stock is advanced a distance d (FIG. 6) equal to the length of metal required for each blade 17.

During the initial press stroke the lever 64 connected to the rod 61 is depressed manually to raise the stop 58 in a counterclockwise direction, as viewed in FIG. 5, to release the leading edge of the metal stock thus permitting the feed mechanism 55 to move the metal stock between the die shoes 52 and 54. Thereafter the stop 58 rides on top of the metal stock and, insofar as the operation of the die 50 is concerned, is substantially inoperative.

At the first station in the die 50, the width of the stock is trimmed and the notch 66 is cut in each lateral edge thereof as shown in FIGS. 4–6. This is accomplished when the male cutter 68 (FIG. 7) having the notch cutting tool 69 rigidly or integrally secured in one corner thereof is forced into the complementary female opening 71 (FIGS. 4 and 7) in the bottom die steel 72 by movement of the top die shoe 52 into engagement with the bottom die shoe 54. The metal which is cut from the stock in this operation passes through the openings 71 and 74 in the bottom die steel 72 and shoe 54, respectively, to a collection hopper (not shown) positioned at some point exterior of the machine in a well known manner.

The die 50 controls the movement of the metal stock therethrough by the use of two pilot pins 75 on each side of the metal stock S, each of which engages a notch 66 and thus limits the forward, backward, and lateral movement of the metal stock so that it will be precisely positioned with respect to the various components of the die 50. Each of the pins 75 is secured on the top die shoe 52 by a threaded plug 77 which engages the similarly threaded bore 78 in the shoe 54 to clamp the heads 81 of the pins against the support block 83 which is rigidly secured to the die shoe 54, and a second plug 84 is provided for locking the plug 77 against movement. The lower portion 85 of each pin 75 has a rectangular cross-section which corresponds to the shape of the notches 66, and the nose 87 thereof is tapered or bullet shaped so that, when the pins 75 are lowered into engagement with the bottom female grooves or slots 88 in the bottom die steel 91, they will engage the notches 66 and properly align the metal stock.

A spring block 93, shown best in FIGS. 4, 5, and 7, is mounted on the lower die shoe 54 for raising the metal stock when the top die shoe 52 is moved to the raised position thus allowing the metal stock to be advanced without interference from the various lower die steels. The spring block 93 is positioned between the side blocks 95 (FIG. 4) which have the overhanging fingers 96 (FIG. 7) for stripping the metal stock from the upper die steels as the top die shoe 52 is raised. This block is urged upwardly by the springs 97 (FIG. 5) interposed between the block 97 and the bottom die shoe 52, and the upward travel thereof is limited when the shoulders 98 formed on the die steels 101 and 102 engage similar shoulders 104 on the spring block 93, as seen in FIG. 5.

A clamping plate 105 (FIG. 7) provided on the upper die shoe 52 initially engages the metal stock and holds it against the spring block 93 as the die shoes 52 and 54 are moved together. The plate 105 is mounted on the top die shoe 52 by the support pins 107 which extend through the die shoe 52 into threaded engagement with the plate 105, and the heads 106 thereon limit the downward movement of the plate 105 with respect to the top die shoe 52. The clamp plate 105 is substantially coextensive with the spring block 93 so that when the top die shoe 52 moves downwardly, the clamp plate holds the metal stock against the spring block 93.

The springs 108 which are interposed between the block 83 and the clamp plate 105 have a total effective bias which is greater than that of the springs 97 acting on the spring block 93 so that the spring block 93 is forced downwardly when the top die shoe 52 first contacts the metal stock. When the travel of the spring block 93 is taken up, the clamp plate 105 is moved in an upward direction relative to the die shoe 52 to expose the cutting tool 68 so that the metal is held firmly in position during the trimming and notching operations. As shown in FIG. 7, the leading ends 87 of pilot pins 75 engage the notches 66 in the metal stock before the plate 105 and block 93 reach their clamping positions so that the pins properly align the metal stock prior to its being clamped against movement.

The next operation is to bend or turn up the edge of the metal stock to a vertical position, as shown in FIG. 6 to form the flange 110 along each side of the metal stock which ultimately forms the flanges 24 (FIG. 28) on each end of the blades 17. This bending operation is accomplished when the metal stock is forced downwardly onto the die steels 112, shown in FIGS. 4 and 10, which are positioned below the overhanging portion 113 of the side blocks 95 so that the fingers 96 extend above the metal stock at this station and thus limit its upward movement. The leading edge 115 (FIG. 4) of the die steel 112 is appropriately curved so that when the complementary upper die steel 116 forces the metal downwardly thereagainst, each edge of the metal stock is turned up to form a flange 110, as shown in FIG. 6. The upper die steel 116 is mounted on a spring block 117 which has a limited amount of spring biased travel between the shoulders 118 and 119 of the spring block 117 and the mounting member 121, respectively, so that the metal stock will be held firmly in position prior to this shaping operation. As will be seen, the spring block 117 and the mounting members 121 on either side thereof extend forwardly from this station to the cutoff station.

The next station in the die 50 performs a piercing operation which cuts the elongated slots 125 (FIGS. 4 and 6) in each side of the metal stock a short distance from the flange 110. Each slot has a curved portion 126 on the leading end thereof and defines the lateral extremities of the blade surface 127 on one side and the flange 110 on the other with the connecting portion 128 remaining between the trailing edge of the blade surface and the flange 110. As shown in FIG. 5, the slots 125 are cut by an appropriately shaped punch 129 held on the top die shoe 52 by the threaded plugs 131 which engage the similarly threaded bore 132 to clamp the head 133 of the punch 129 against the support member 134 rigidly secured to the top die shoe 52. The punch 129 is received in the complementary female opening 135 (FIG. 4) formed between the die steels 137 and 138, and the metal which is punched from the metal stock passes through the openings 141 to a point exterior of the machine.

Next the metal stock passes through a series of blade forming stations, as seen in FIGS. 4 and 5, wherein the blade surfaces 127 of the individual blades 17 are progressively shaped. Thus a slit or lance 145 is first cut laterally across the metal between the curved portion 126 of the elongated slots 125 by the top die steel 146 which is connected to the upper die shoe 52 by the bolts 147 and has the cutting edge 148 thereon which cooperates with the bottom die steels 151 and 152. At the next station, the forward or leading edge 153 of the blade surface 127 is formed by the top die steel 154 which cooperates with the bottom die steel 155.

Then, after a dead station, the center and trailing portions 157 of the blade surface 127 together with the slanted shoulders 158 (FIGS. 6 and 11) are formed by cooperation between the top die steels 161 and 162 and the bottom die steels 164 and 165. Each slanted shoulder is formed on a connecting portion 128 and permits the leading edge of the blade surface 127 to be raised above the plane of the metal stock, and as shown in FIG. 11, the shoulder forming die steel 162 is mounted on the spring block 117 and has a downwardly extending finger 166 rigidly secured thereto for cooperation with the appropriately shaped groove 167 in the bottom steels 164 and 165 to form the slanted shoulder 158 on the metal stock. Since the die steel 162 is also mounted on the spring block 117, the finger 166 engages the metal stock and holds it firmly prior to the forming operation.

Another spring block 170 (FIGS. 4, 5, 8 and 11) is provided on the lower die shoe 54 and extends from one side of the metal stock to the other on either side of the die steel 164 so that the metal stock in this part of the die 50 will be automatically raised above the various bottom die steels each time the top die shoe 52 is raised, thus facilitating the forward advance of the stock. As shown in FIG. 8, the spring block 170 is urged upwardly by the springs 172 which are interposed between the bottom die shoe 54 and the block 170, and the upward movement thereof is limited by engagement of the shoulders 173 and 174 on the side members 176 and the block 170, respectively.

The die steels 164 and 165 which coact with the fingers 166 to form the slanted shoulder 158 must be precisely positioned with respect to the finger 166 and consequently they are rigidly secured to the bottom die shoe 54. Thus the spring block 170 is provided with a cutout portion 177 having cross members 178 and 179 on either side of the die steel 164 (FIG. 4) so that the block 170 may be formed as a single unit. The spring block 170 has the shoulders 180 (FIGS. 4 and 8) formed therein for support of the flange 110 of the metal stock so that blade surfaces 127, after they have been formed, do not absorb the entire upward force applied to the metal stock when the upper die shoe 52 is moved upwardly causing the spring block 170 to raise the stock above the die steels on the lower die shoe 52.

After the blade surfaces 127 on the metal stock have been completely formed, they move through two dead stations above the cross member 179 of the spring block 170 into the cutoff station wherein the individual blades 17 are severed from the metal stock. For this purpose, the cutoff tools 185 (FIG. 9) are secured to the upper die shoe 52 by the threaded plugs 187 which engage the similarly threaded bore 188 and clamp the head 191 of each tool 185 against the support member 192 which is rigidly secured to the die shoe 52.

The spring biased clamping block 117 has downwardly extending fingers 193 secured thereto which engage and hold firmly the metal stock as the upper die shoe is lowered so that it is held firmly in position prior to the cutoff operation. Specifically, as the die shoe 52 is lowered, the fingers 193 engage the stock on the inboard side of the upturned edge 110 and carry it into position on the lower die steels 194 and 195 to thereby hold it in position. As the upper and lower die shoes are moved together, additionally the cutting edge 196 of the tool 185, which is normally aligned with the fingers 193, is extended through the aperture 197 in the spring block 117 and into the slot 198 in the die steel 194, wherein it cuts the portion 199 between the notch 66 and the slot 125 from the metal stock thus severing the blade 17. The metal portion 199 cut from the stock passes through the opening 201 to a point exterior of the machine in the usual manner. The severed blade 17 is held firmly in position on the die steels 194 and 195 by the slidable plate 202 which is urged to the right, as viewed in FIG. 9, by the spring 204 interposed between the head 205 of the screw 207 and the flange portion 208 of the plate 202.

As the upper die shoe 52 moves upwardly, the pusher 210 (FIG. 5) mounted on one end of the rack 211 engages the severed blade 17 and forces it through the horizontal tracks 212, which engage the flanges 24 on each end thereof, to the position shown in broken lines in FIG. 5. The rack 211 is reciprocally mounted below the path of movement of the metal stock and is driven by a pinion 215 which is rotatably mounted in the machine frame F below the lower die shoe 54 and is driven from another rack (not shown) secured to the press 16 so that the rack 211 moves forward each time the upper die shoe 52 is raised, and returns as the die shoe 52 commences its downward stroke. A suitable bearing element 217 is provided for frictionless support of the forward end of the rack 211. When the rack 211 and the pusher 210 are being returned, the metal stock is in its raised position due to the action of the spring block 170 thus permitting the pusher 210 to move freely thereunder. Other drive means can be utilized to reciprocate the rack without departing from the scope of the invention so long as the above described functional requirements thereof are substantially maintained.

As shown in FIGS. 12 and 13, after a blade 17 is moved through the horizontal tracks 212, it passes into a short section of track 220 on the pivotal mounting block 221 wherein it is aligned with the vertical track 222 formed between the elongated side members 225 and 226. When in the track section 220, pressure is exerted in a longitudinal direction on the blade 17 by the spring 227 which is interposed between the plug 228 and the piston 230 and acts through the rod 231 to urge the block 221, which pivots about the mounting pin 233, against the blade 17, thus holding it firmly in position.

As the upper die shoe 52 moves downwardly, the transfer member 235 (FIG. 5) engages the blade 17 in the track section 220 and carries it through the vertical track 222 between the elongated member 225 and 226 into holding engagement with the index head 15a, as will be described. The lower guide 220a of track section 220 has a thickness less than the upper guide 220b and is slightly rounded so that when the transfer member 235 engages the blade 17, it will cam the block 221 in a counterclockwise direction (FIG. 12) to release the blade 17. The leading edge 237 (FIG. 5) of the transfer member 235 is suitably curved and has a projection 238 thereon for engaging the rear or trailing edge of the blade 17 to prevent angular movement thereof as it is moved downwardly in the track 222.

The track member 222 is also pivoted about the pin 233 and is biased into clamping engagement with the blade 17 by the spring 240 which is interposed between the head 247 of the pin 243 and the plug 244, and exerts a pressure on the member 222 through the pin 243 so that the clamping pressure is applied to the blade 17 and movement through the track 222 is induced only by the transfer member 235. Both the track members 212 and 220, and the side members 224 and 225 are preferably formed from hardened metal having a high degree of finish to its surfaces so that the blades 17 move easily therethrough with a minimum of friction and wear. Since the structure shown in FIG. 12 is identical to that on the opposite side of the die 50, only one side has been illustrated and described.

It should now be apparent that, after the stock is initially fed through the die 50, a blade 17 will be manufactured and transferred to the index head 15a during each stroke of the press. As shown in FIG. 5, the top and bottom die shoes 52 and 54 each have the various spring blocks, die steels, etc., secured thereto so that they may be readily removed and replaced so that blades of different length can be formed by the machine with a minimum of set-up time.

While the above described apparatus for producing the individual blade 17 is preferred, it is within the scope of this invention to use other and different apparatus for this operation. Similarly, while the production of the individual blade by the machine is preferred, it is possible to manufacture the blade 17 separately and modify the transfer member 235 and associated structure to transfer the blade to the index head 15a so that the machine fabricates the blower wheels from components formed by other machines.

Index heads

Referring now to FIGS. 16 and 22, each of the index heads 15 is identical and, as mentioned, the letters *a* through *d* are suffixed for distinguishing the stations in which the ferris wheel 10 has positioned the index heads 15. Each of these index heads includes a body member 250 supported for rotation in a bore 251 formed in the arm 12 of the ferris wheel 10 by the bearings 253 so that the index head 15 will rotate freely therein. The body member 250 has a bore 255 in the central portion thereof for receiving the reciprocal fixture on ring holder 256, and the bearing sleeve 258 is provided therebetween for reducing friction as the fixture 256 reciprocates axially in the bore 255.

The guide pins 260 are rigidly mounted on the body member 250 and extend into the guide bores 261 in the shoulder 263 of the fixture 256 for the purpose of preventing relative angular movement between the member 250 and the fixture 256 while permitting relative reciprocal movement therebetween. Similarly, the screws 264 extend through the bores 265 in the member 256 into threaded engagement with the body member 250 for limiting the axial movement of the fixture 256 away from the body member 250. Interposed between the body member 250 and the shoulder 263 are a number of coil springs 266 (only one is shown) for the purpose of urging the fixture 256 in an axial direction away from the body member 250 to the position shown in FIG. 22.

Three rings 270 which receive and hold the blades 17 are suitably secured to annular spacers 271 which are in turn secured to the shoulder 263 of the fixture 256. The rings 270 have substantially identical configurations which include a plurality of equally spaced slots 273 (FIGS. 14 and 15) cut in the outer periphery thereof. These slots have a curved surface 275 on one side thereof for engagement of the similarly curved blade surface of the blades 17, while the other side of the slots 273 have the smoothly curved projection 276 thereon for engaging the opposite side of the blade surface. As seen in FIG. 14, the center ring 270b is mounted with its slots 273 angularly offset with respect to the slots in the outside rings 270a and 270c so that when the leading edge of a blade 17 is forced into the slots aligned in the three rings 270 by the transfer member 235, the blades 17 will be subjected to a limited amount of tension and thus held firmly in position on the index heads 15.

Referring again to FIGS. 16 and 22, a knockout screw 280, which is utilized to release a finished blower wheel 25 from the index head 15, threadedly engages the tapped bore 281 in the central portion of the fixture 256. The relative position of the screw 280 can be adjusted with respect to the member 256 by merely loosening the lock nut 283, and appropriately turning the screw 280 until the desired adjustments have been made. When the fixture 256 is forced to the right, as viewed in FIG. 22, by the screw 280, the ring 270a is moved against the surface 284 of the body member 250 and is slipped from engagement with the blade 17 so that the other rings 270b and 270c hold the blower wheel rather loosely on the index head.

The end ring 22 which is positioned on an index head 15 before the blades are placed thereon, is held around the outer periphery of the left side of the body member 250 (as viewed in FIG. 22) by the spring biased latches 285 (FIG. 18) having a cam portion or nose 286 which engages the radially extending inner flange 22a of the end ring 22 for the purpose of holding it in position on the shoulder 287 formed on the body member 250. The latches 285 are released by exerting a force on the end ring 22 in the direction to separate it from the body member 250, which causes the noses 286 of the latches to cam the latches 285 radially inwardly thus releasing the end ring 22. The filler blocks 288 (FIG. 16) are secured to the spacers 271 between the rings 270 at three or more points around the spacers 271 so that the end rings 22 can be easily slipped over the rings 270 into engagement with the body member 250. The ring 270c (FIG. 18) is cut out at 289 for clearance of the latches 285 as the fixture 256 is moved against the body 250 during the knockout operation.

The drive end of the index heads 15 has an extension 290 thereon having the annular drive member 291 secured thereto by a key 293, which locks these two members against relative angular movement, and by the nut 295 which is threaded onto the extension 290 and prohibits relative axial movement therebetween. A number of key elements 296 (FIG. 19) are secured equally around the drive member 291 in the annular slots 297 formed in the member 291 so that the teeth 298 thereon will be engaged by drive heads for rotating the index heads 15 during the blade receiving and spinning operation, as will be described.

Index head drive mechanism

When the index head 15a is receiving the individual blades 17 from the transfer member 235, it is driven from the crank shaft 18 of the press through the index head drive mechanism 20 so that the rotation of the head 15c is correlated with the operation of the transfer member 235, and the slots 273 in the rings 270 are positioned to receive each individual blade 17 as it is carried downwardly from the die 50. Accordingly, as shown in FIGS. 1 and 16, the timer belt 19 transfers rotary power from the crank shaft 18 of the press 16 to the gear box 301, which drives the transfer shaft 303 extending across the entire width of the machine, as indicated in FIG. 1, so that the index heads 15a can be driven regardless of the side of the ferris wheel 10 on which they are mounted.

The transfer shaft 303 has a removable section 303a in the central portion thereof for permitting access to and removal of the die 50, as well as to give minute adjustment from left to right and allow for tolerance in this drive mechanism, and the connection sleeves 305 (only one is shown in FIG. 16) are provided so that the section 303a may be easily removed. The sleeves 305 are secured against relative angular movement on the end portions 307 of the shaft 303 by the keys 308, and they are locked to section 303a by the tapered pin 310 driven into the complementary bore 311 extending through the sleeve 305 and the shaft section 303a so that during normal operation the shaft 303 and the section 303a act as a single integral shaft.

Both the right and left sides of the index head drive mechanism are substantially identical in construction and operation, and only the right side thereof, as seen in FIGS. 16 and 17, is described in detail. Thus the transfer shaft 303 is drivingly coupled to the output shaft 312 of the gear box 301 by the key 313 which engages the appropriately shaped grooves in both the drive shaft 312 and the transfer shaft 303. The transfer shaft 303 is rotatably supported in the machine frame by the bearings 315, and is held against axial movement to the right by the press fitted ring 317, and against movement to the left by the pinion 318 having the shoulder 319 which engages the thrust bearing 321 suitably secured to the machine frame.

A drive shaft 323 is similarly mounted on the bearing 325 in the machine frame below and substantially parallel to the transfer shaft 303, and axial movement thereof is prohibited by the rings 327 threadedly secured to its ends. The pinion 318 on the right end of the transfer shaft 303 rotates the drive shaft 323 through the meshing engagement with the gear 328 which is locked to the shaft 323 by the key 329 and the nut 330. The left end of the drive shaft 323 has a pinion member 331 rigidly secured thereon, and having elongated and axially extending teeth 332 which drive the gear 334 rotatably mounted in the slidable carriage 335 (FIG. 18).

The carriage 335 transfers rotary power from the drive shaft 323 to the index head 15a, and since the index heads 15 are movable with the ferris wheel 10, the carriage can be shifted between an engaged position, as shown in FIG. 16 wherein it engages the index head 15a, and a retracted position wherein it is moved to a point spaced from the index head 15a. Thus, as shown in FIG. 20, the carriage 335 moves back and forth in a direction parallel to the axis of the drive shaft 323 on the rollers 337 and 338 which ride on the top of the tracks 340 and the side 341 of the bracket 343. These rollers are rotatably secured to the side members 344 which have the base 345 member releasably supported therebetween.

An air cylinder 347 has its piston rod 348 connected to the right end of the carriage 335 for the purpose of shifting it between the aforesaid advanced and a retracted position during which the gear 334 slides on the elongated teeth 332 of the pinion 331 so that the teeth of these two members are in meshing engagement regardless of the position of the carriage 335. The air cylinder 347 can have its position with respect to the machine frame adjusted by appropriately loosening and tightening the nuts 350 which threadedly engage the support member 351 of the air cylinder 347 and are positioned on either side of the bracket 353 extending from the machine frame. As shown in FIG. 17, the rod 354 which is connected to the carriage 335 operates the limit switches LS2 and LS3 to give appropriate indication to the electric controls of the position of the carriage and its associated apparatus.

As shown in FIG. 17, the drive head 355 which engages and drives the index head 15a is detachably mounted on the carriage 335 by the bolts 357 and the L-shaped clamp members 358 which engage the shoulders 359 formed on the drive head 355. This arrangement permits transfer of the drive head 355 to the carriage 335 on the left side of the machine during the production of a counterclockwise blower wheel wherein the back plate is applied to the opposite ends of the blade 17. A guide pin 360 (FIG. 16) is provided to insure that the drive head 355 will be properly aligned on the carriage 335 before the clamps 358 are engaged.

The drive head 355 has a gear 362 rigidly mounted therein on the shaft 363 and driven by the gear 334 rotatably supported on the pin 366 in meshing engagement with the pinion 331 on the drive shaft 323. The shaft 363 has a drive member 370 secured on the left end thereof for engagement with the index head 15a, and the central portion of this drive member is cup-shaped and has a bore 371 therein which accommodates the extension 290 on the index head 15a to align properly these two members when they are brought together.

The drive member 370 has a plurality of axially extending splines 373 (FIG. 16) on the outer periphery thereof similar to those shown in FIG. 23, each of which tapers to a point so that when the drive head 355 is moved into engagement with the index head, the splines 373 will easily and smoothly align with the teeth 298 of the index head 15a. An arm 375 is attached rigidly to the right end of the shaft 363 for the purpose of actuating a switch LS9 (FIG. 17) each time the shaft 363 is rotated one complete revolution, thus indicating that the index head 15a has been completely filled with the blades 17 so that the ferris wheel 10 can be indexed.

*Spinning assembly*

The spinning assembly, shown in FIGS. 21 through 29, positions the end ring 22 and the back plate 23 adjacent the opposite ends of the individual blades 17 on the index head 15c and spins the outer peripheral flanges 377 on the end ring and back plate over the flanges 24 on the individual blades 17 thus producing a finished blower wheel 25. The assembly includes substantially identical structure on either side of the ferris wheel 10 so that the assembly can be utilized regardless of whether a clockwise or counterclockwise blower wheel is being made. For producing a counterclockwise wheel the assembly utilizes a drive head 380 which engages and drives the index head 15c, a back plate guide 382 which properly locates the back plate 23 with respect to the index head 15c, a back plate head 383 which picks up the back plate 23 from the guide 382 and carries it into engagement with the blades 17 on the index head 15c, and a spinning wheel mechanism 385 which deforms the flanges 377 over the ends of the blades 17.

The heads 380 and 383 are supported for rotation by spin carriages 388 which are slidably mounted on the support members 390, as shown best in FIG. 25, and the support members 390 are mounted on the base 391 which is a portion of the machine frame F. In detail, the spin carriages 388 have hardened support feet 393 on each side thereof which are engaged by the inverted L-shaped clamps 394 suitably secured to the support member 390 so that relative movement between the members 388 and 390 is limited to a horizontal back and forth movement, as viewed in FIG. 21. Similarly, the movement of the support member 390 is limited since its support feet 396 are engaged by the L-shaped clamp members 397 secured to the base 391. The bearing strips 398 between the support member 390 and the base 391 are coextensive with the feet 396 for reducing friction and wear between these components.

As indicated in FIG. 21, the heads 380 and 383 are offset from the vertical center line of the machine although their travel into engagement with the index head 15c is the same. Consequently, when these heads are reversed, as required to make a clockwise wheel, the retracted position of the carriages 388 must be changed so that when they are advanced, the associated head 380 or 383 will properly engage the index head 15c. For this purpose the adjusting rod 400 (FIG. 23) having the threads 401 on one end thereof is rotatably secured by the connection 403 to each of the carriages 388, and the threads 401 extend through the upstanding projections 405 which are rigidly connected to the support members 390. When the lock nuts 406 are loosened and the rods 400 rotated by applying a suitable wrench to the end 407 thereof, the carriages 388 are moved back and forth with respect to the members 390 thus adjusting the relative position between the carriage 388 and the ferris wheel 10 so that proper changes can be made in the retracted position of the carriage 388 to permit interchangeability of the drive and back plate heads 380 and 383.

A suitable pneumatic cylinder 408 is provided on each side of the machine, and their piston rods 409 are connected to the support members 390 for effecting reciprocating movement of the carriages 388 and their associated member 481 is limited by the adjustable stop screw 490 which threadedly engages the cross member 491 supported on either side of the saddle member 481 by the blocks 493 which are suitably secured to the base 391. The stop screws 490 effect fine adjustments in the upper limit of movement of the spin rolls 470 since their precise positioning in the raised position is critical as it determines the degree of deformation of the flanges 377 on the end ring 22 and back plate 23, and a suitable limit switch LS6 (FIG. 33) is actuated when the spin wheels 470 reach their raised position. Large adjustments in the positioning of the spin rolls 470 are made by the use of a spacer block 495 placed between the bracket 476 and the saddle 481.

*Sequence of automatic operation*

The operation of the machine is best described in connection with the electrical and pneumatic diagrams shown in FIGS. 30 to 36 and the structure shown in FIGS. 1 to 29. The electrical system can be viewed in its entirety by placing FIGS. 30 to 34 end to end with the bottom of FIG. 30 adjacent the top of FIG. 31, etc. For convenience in explanation, each conductor in the electrical schematic is designated by a single line number with most of the horizonal conductors being numbered consecutively along the left-hand edge of the figures by the numbers 510 through 577, while reference characters in the 900 series refer to the pneumatic circuits of FIG. 36. Each of the relays used in the electrical system comprises a coil which is given the relay number and one or more normally closed or normally open contacts designated by the same reference characters as the associated coil with a small letter suffixed thereto. For example, the relay R3 has the normally open contact R3a and the normally closed contacts R3c operated thereby.

For purposes of this explanation, it is assumed that the machine is set up to produce a counterclockwise blower wheel, and that the metal stock S is fed through the die 50 so that a blade 17 will be transferred to the index head 15a for each stroke of the press 16. Both automatic and manual operation of the machine are controlled from a number of selector switches on the panel P (FIG. 1), and to commence operation it is first necessary to energize the index, press, and spin motors 27, 46 and 434, respectively, each of which has a switch on panel P and may be connected through the circuit breaker 500 (FIG. 30), the fuses 501 and lines 503 to a source of power.

Thus, to initiate forward operation of the press motor 46, the normally open switch 580 in line 510 is closed manually to complete a circuit to the relay M1F between the lines 507 and 508 which are connected through the transformer 571 and the lines 583 to the power lines 503. When the relay M1F is energized, the normally open contacts M1Fa in line 511 are closed to hold in the relay M1F after the switch 580 is released. Simultaneously therewith, the normally open contacts M1Fb in lines 503 are closed to energize the motor 46, which continues to operate until the circuit to the relay M1F is opened, either by opening the on-off selector switch 501 in line 507, by manually actuating one of the normally closed switches 585 spaced at convenient locations around the machine, or by opening the normally closed stop switch 586 in line 510.

If desired during set-up, the direction of rotation of the press motor 46 can be reversed by momentarily closing the manually actuated switch 590 in line 512 thus completing a circuit to the relay M1R, provided however that the relay M1F is not energized so that the normally closed contacts M1Fc in line 512 remain in their closed position. Once this relay is energized, the normally open contacts M1Ra in line 513 are closed so that the relay M1R remains energized until this circuit is broken. When relay M1R closes, it closes the normally open contacts M1Rb in lines 591 to reverse the connections to the press motor 46, causing operation in a reverse direction, and opens the normally closed contacts M1Rc in line 510 to prohibit energization of the relay M1F while the motor 46 is running in this reverse direction. The lights 593 and 594 may be provided in parallel with the relays M1F and M1R, respectively, for the purpose of giving visual indication when the associated relay is energized.

A circuit to spin motor 434 is completed when the relay M2 in line 514 is energized by momentarily closing the normally open switch 596 and thereby closing the normally open contacts M2a in lines 600 to effect operation of the spin motor 433. A holding circuit for the relay M2 is also completed when the normally open contacts M2b in line 515 are closed to complete a circuit around the manually actuated switch 596 and maintain energization of the relay M2 until the normally closed stop switch 601 is opened manually, or until this circuit is opened in some other way.

Closing the normally open switch 603 completes a circuit through line 516 to energize the relay M3 and close the normally open contacts M3a in lines 605 to effect operation of the index motor 27. Energization of this relay is maintained through the line 517 when the normally open contacts M3b are closed by the relay M3, and operation of the motor 27 continues until its circuit is opened, for example, by depressing manually the normally closed stop switch 607 in line 516. The lights 608 and 609 may be mounted in parallel wih the relays M2 and M3, respectively, for giving the operator visual indication of the status of the associated relay and motor.

Since a clockwise wheel is to be produced, the selector switch 610 in line 518 (FIG. 31) is appropriately positioned to complete a circuit to relay R17 which then operates a number of contacts to program the electrical system in an appropriate manner for the making of a clockwise blower wheel, as will be explained in detail. When it is desired to make a counterclockwise wheel, the selector switch 610 is positioned to complete a circuit through line 519 and energize relay R19 which suitably programs the system, as will be seen. To effect automatic operation of the machine, the automatic-manual selector switch 615 (line 523) is moved to the automatic position, as shown in the drawings, to position its contacts 615a through 615h so that the electrical system is set for automatic operation.

In the automatic operation, the operator first places an end ring on the index head 15d where it is held by the latches 286, and he depresses the normally open switches 620 in line 521 to effect movement of the ferris wheel 10 so that the index head 15d is moved into the position shown by the index head 15a. That is, switches 620 are closed to energize the index clutch relay R1 providing the following conditions exist: The right and left-hand spin carriages 380 are back so that the limit switches LS5 and LS5A in line 521 are closed, the blade index drive heads 355 are back so that the limit switches LS3 and LS3A in line 521 are closed, the spin rolls 470 are down so that the limit switch LS7 is closed, the ferris wheel 10 is in a stationary position so that the switch LS10 engages contact 521a in line 521, and the contacts R16a are closed by relay R16 in a line 526 which is energized when the press ram 53 is at the top of its stroke so the limit switch LS1 in line 526 is closed.

Thus when the above conditions exist and the switches 620 are closed by the operator, a circuit is completed in line 521 to the relay R1 which immediately closes contacts R1a in line 621 (FIG. 30) causing energization of the coil 623 to effect engagement of the clutch of the clutch-brake unit 28 so that the ferris wheel 10 is rotated through 90° to the next position since the index motor 27 is running. The normally closed contacts R1b in line 625 leading to the coil 626 of the brake of unit 28 are opened simultaneously with the closing of the contacts R1a by the relay R1 so that the brake is released. The switches 620 need only be momentarily closed since a holding circuit heads 380 and 383 between engaged and retracted positions with respect to the index head 15c. When the support members 390 are moved to the advanced positions the lock pins 410 (only one of which is shown in FIG. 24) are forced by the air cylinders 411 through the clamp members 397 into engagement with the notches 412 in the members 390 for locking the carriages 388 against the movement. The limit switch LS8 is actuated by the right-hand pin 410 for indicating whether the pin is engaged or disengaged, whereas the limit switches LS4 and LS5 which are operated by the rod 413 connected to the carriage 388 sense whether the carriage 388 is in its advanced or retracted position. Limit switches LS4A, LS5A and LS8A (FIGS. 31 and 33) are provided on the left-hand side of the machine for performing substantially the same function as their counterparts LS4, LS5 and LS8, respectively, on the right side of the machine.

The drive head 380 on the right-hand spin carriage 388 is secured to and rotated by the end of the drive shaft 414 (FIGS. 22 and 23) which has its left end supported for rotation in the carriage 388 by the bearings 415, while the lock nut 416 and the shoulder 417 (FIG. 22) on the drive shaft 414 prohibit relative axial movement between the shaft 414 and the spin carriage 388. The drive head 380 engages the index head 15c in substantially the same manner as the drive member 370 of the drive head 355 engages the index head 15a during the blade receiving operation.

As shown in FIG. 23, the central portion of the drive shaft 414 is supported by the bracket 420 extending upwardly from the base 391, and this shaft is splined so that the drive head 380, the spin carriage 388, and the drive shaft 414 may be shifted from right to left and without interference with the mounting bracket 420. The sleeve member 421 having the keys or splines 422 held therein for engagement with the splined shaft 414, is held in the bearing member 423 of the mounting bracket 420 by the shoulder 425 on one end and the washer 427 and nut 428 on the other end. The drive pulley 430 is then connected to the sleeve member 421 by the bolts 431, and alignment between these two members is insured by the guide pin 432. This arrangement permits the drive head 380, the spin carriage 388, and the drive shaft 414 to be reciprocated by the cylinder 408 while allowing the drive pulley 430 to transfer rotating motion to the shaft 414 without reciprocating therewith. As shown in FIGS. 3 and 21, an identical drive arrangement is provided on the left side of the spinning assembly, and the pulleys 430 are driven from the drive shaft 433 which extends across the entire width of the machine and is connected to the output shaft of motor 434 through a suitable clutch 435.

The left spin carriage 388 (FIGS. 21 and 22) has the back plate head 383 thereon which separates the back plate 23 from its guide 382 and carries it into operative relation with flanges 24 on the ends of the blades 17 on the index head 15c. The head 383 includes a body member 436 which is secured to the flanged end of 437 on the innermost end of the drive shaft 414 on the left side of the machine by the through bolt 438, and the guide pins 439 are provided between these two members to insure proper alignment therebetween. It should be noted that the shaft 414 and the flanged end 437 on the left-hand side of the spinning assembly are identical to those on the right side thereof so that the heads 380 and 383 are easily interchanged.

The ring 440 is provided around the periphery of the body member 436 and has the projection 441 thereon (FIGS. 28 and 29) which corresponds to the grooves 442 formed in the back plate 23 so that when the head 383 moves through the aperture 444 in the back plate guide 382, the back plate 23 is stripped therefrom and held on the body member 436 since a certain amount of force is exerted by the head 383 against the back plate 23 to disengage it from the guide 382, to be described, which causes the projection 441 to be forced into the groove 442 in the back plate 23.

The back plate guide 382 receives the back plate 23 and guides it into alignment with the aperture 444 from where it is picked up by the head 383, as described above. The guide 382 includes a base plate 445 which is secured to the base 391 by the upstanding support members 446, and has the guide rails 447 bolted thereto along opposite edges with their inwardly projecting flanges 448 extending substantially parallel to but spaced from the base plate 445 to provide grooves for guiding the back plate 23 into alignment with the aperture 444, which is of sufficient size to permit movement of the head 383 therethrough (FIG. 22). As shown in FIG. 26, the periphery 449 of the aperture 44 is sloped in an axial direction to insure that the head 383 will align therewith, and the smallest internal diameter of this aperture is smaller than than the outer diameter of the back plate 23 so that it will not pass through the aperture 444.

The back plate 23 is held against axial movement to the right, as viewed in FIG. 26, by the latches 450 provided on opposite sides of the aperture 444 for engaging the outer peripheral flanges 24 of the back plate 23. The latches 450 are pivoted on the pins 451 secured in the blocks 452 which are mounted on the base plate 445, and they are urged into engagement with the back plate 23 by the springs 453 which are interposed between the latch 450 and bores 454 formed in the guide rails 443. The nose portions 455 of the latches 450 are rounded so that when the head 383 moves through the aperture 444 and engages the back plates 23, the latches 450 will release the back plate 23. The springs 453 are of sufficient bias to cause the grooves 442 in the back plate 23 to be engaged by the projections 441 on the head 353 so that the back plate will be supported on the head 383 after separation from the guide 382.

On the outermost end of each drive shaft 414 opposite the heads 380 and 383, the reciprocating air cylinders 460 (FIGS. 21–23) are provided for operating the knockout or piston rods 461 which extend co-extensively through the tubular drive shafts 414 for releasing the finished blower wheel 25 from the index head 15c. As shown in FIG. 22, a knockout head 463 reciprocates in the bore 464 of the body member 436 and is secured on the terminal end of the knockout rod 441 for engaging the knockout screw 280 to release the finished blower wheel 23 from the head 15c, in a manner described above, by forcing the fixture 256 against the body 250 so that one of the rings 270 is released from engagement with the blades 17.

The spinner wheel mechanism 385, as shown in FIGS. 21, 22 and 27, includes the two spinning wheels 470 which deform the outer peripheral flanges 377 (FIG. 26) of the end ring 22 and back plate 23, respectively, around the upturned edge or flange 24 on each of the blades 17 to lock these members together. The spin wheels 470 are mounted on the arms 475 (FIG. 22) extending from opposite sides of the top portion of the mounting bracket 476 and have the bearings 477 secured thereon by the cap members 478 which are secured to the arm 471 by the screws 479. Each of the wheels 470 has the forming flange 480 projecting radially outwardly therefrom for engaging and deforming the outer peripheral flanges 377 of the end ring and back plate, as shown in FIGS. 28 and 29.

The bracket 476 is suitably secured to a saddle member 481 (FIG. 27) which has one end pivotally secured by the pin 482 to the blocks 484 on the base 391, and has its other end secured to the piston rod 485 of the air cylinder 487 which effects vertical pivotal movement of the saddle member 481 so that the spinner wheels 470 are moved into contact with the flanges 24, and the other end of the motor 487 is secured by conventional fastening means to the base of the machine, as shown in FIG. 21. Upward pivotal movement of the saddle which by-passes the switches LS10 and 620 is completed through lines 630 and 631 when the relay R1 closes normally open contacts R1c.

As the ferris wheel 10 begins to rotate, the limit switch LS10 is moved to engage contact 635a of line 635 to complete a circuit through line 636 to the relay R2 which then closes the contacts R2a in line 630 thus completing a by-pass circuit around the switch LS10 to the relay R2 through the now closed contacts R1d and the line 636. When the ferris wheel 10 has rotated 90° to the next index station, the switch LS10 is moved back into engagement with the contact 521a so that a circuit to the cycle start relay R3 in line 523 is now completed through the line 521, the line 640 having the now closed contact R2b therein, and the line 523.

Energization of the relay R3 immediately opens the normally closed contacts R3a in line 521 to terminate energization of relay R1, and thereby causing the contacts R1a to be opened to deenergize the index clutch coil 623 and disconnect the motor 27 from the ferris wheel drive shaft 18. Simultaneously, the contacts R1b in line 625 are closed so that the brake coil 626 is energized to engage the brake of unit 28 to prohibit additional rotation of the ferris wheel 10. A circuit to relay R3 is also maintained through line 523, the line 645 having the normally closed contacts R15a therein, and the new closed contacts M1Fd, R3b and 615a. The normally closed contacts R2d and R3f in lines 521 and 642, respectively, are provided as a safety measure to insure the proper operation of the system when the operator maintains the switches 620 in a closed position.

Energization of the relay R3 also causes the drive head 355 on the right side of the machine to be advanced into engagement with the index head 15a by closing the normally open contacts R3c in line 525 which completes a circuit to relay R4 through the limit switch LS11 which is closed when the ferris wheel 10 is in one of its four index positions. The switch LS11 thus prohibits energization of the relay R4 when the ferris wheel 10 is being indexed. The normally closed contacts R4a in line 548 (FIG. 33) are then closed to complete a circuit to the coil 550c through the normally open contacts R17a which have been closed by the clockwise relay R17.

Referring to FIG. 36, energization of the coil 550c causes the four-way valve 900 to be shifted downward causing air under pressure from lines 901 and source P to be connected to line 903 for pressurizing the air cylinder 347 to move right-hand index drive head 355 into driving engagement with the index head 15a on the ferris wheel 10. If a counterclockwise wheel is being produced, the normal contacts R19a in line 548 would be closed rather than contacts R17a in line 548 so that the coil 548c would be energized to shift the valve 906 downwardly to connect the line 907 and the left-hand cylinder 347 to the pressure source P thus moving the left-hand index drive head 355 into its engaged position. When either of the index drive heads 355 is in its advanced position driving the index head 15, one of the limit switches LS3 or LS3A in line 521 is opened so that the index clutch relay R1 cannot be engaged to rotate the ferris wheel 10.

Operation of the press 16 is started automatically when the drive head 355 moves into engagement with the index head 15a since the limit switch LS2A in line 530 (FIG. 32) is moved to the closed position wherein a circuit is completed to the relay R8 in the line 650 through the lines 525, 652 and 530 having the now closed contacts R17b therein, line 654, the now closed contacts 615e and R3d in line 655, the line 656, the line 657 having the now closed contacts R17c therein, and the limit switch LS9A which engages the contact 650b when the arm 375 on the drive head 355 is in the vertical starting position which exists prior to the time the press 16 is started. Energization of the relay R8 is then maintained through the lines 656 and 661, the latter having the normally open contact R8a therein.

When a counterclockwise wheel is porduced, the circuit to the relay R8 is completed through the lines 652, 527, 654, and 655, the normally closed contacts R17d and the limit switch LS9 which is in engagement with the contact 650a when the arm 375 on the drive head 355 is in its vertical starting position. The bulb 658 in line 535 is lighted when the arm 375 is in the vertical position since switch LS9A engages the contacts 660a in line 660 and completes a circuit through the line 659 having the now closed contacts R17e therein and the line 660. Similarly, when a counterclockwise wheel is being produced, this circuit is completed in line 535 through the normally closed contact R17f and the switch LS9 which engages the contact 535a.

The relay R8 also closes the normally open contacts R8b in line 664 to complete a circuit to the press clutch coil 666 and the relay R5 through the normally closed contacts R7a in the line 668 thus causing the valve 915 (FIG. 36) to be shifted upwardly as viewed in FIG. 36 to connect the source of pressure P to the air motor 916 which effects engagement of the press clutch 48 to start operation of the press 16. Each stroke of the press 16 produces an individual blower wheel blade 17 and transfers it to the index head 15a which is being driven by the drive head 355 in correlation with the press operation, as described hereinbefore. As the index head 15a begins to rotate, the limit switch LS9A in line 657 is actuated by the arm 375 and moved into engagement with the contact 679b in line 670 to complete a circuit to the relay R6 in line 672. A holding circuit is completed immediately to the relay R6 through the line 656, the line 676 having the normally open contact R6a therein, and the line 670.

When the index head 15a completes one complete revolution so that it is entirely filled with the individual blower wheel blades 17, the lever 375 again reaches its vertical position to actuate the limit switch LS9A and terminates operation of the press 16. In detail, the switch LS9A is moved back into engagement with the contact 650b to complete a circuit to switch LS1 in line 680 through line 650 and the line 680 having the now closed contacts R6b and R8c therein. When the press stroke reaches its uppermost limit, the switch LS1 is moved into engagement with the contact 681a, and a circuit is completed to the relay R7 through the line 681 having the normally open contacts R6f therein. The contacts R7a in line 668 are then immediately opened thus terminating energization of the relay R5 and the clutch coil 666 so that the spring 917 (FIG. 36) shifts the valve 915 to its alternate position wherein the clutch motor 916 is vented and the press clutch disengaged so that the press 16 is stopped with its ram 53 at the top dead center position.

The relay R7 also closes the normally open contact R7b in line 551 (FIG. 34) to complete a circuit through the now closed contacts R17g in line 552 to the coil 552c in line 551 to cause the clockwise index head 335 to be retracted. Thus the valve 900 is shifted upwardly as viewed in FIG. 36 to connect the line 901 and the pressure source P to the line 920 causing the right-hand air cylinder 347 to retract the clockwise drive head 355. When a counterclockwise wheel is being produced, the electrical circuit would be completed through the line 551 and normally open contacts R19b therein, to energize the coil 551c and retract the counterclockwise index drive head 355 by shifting the valve 906. The relay R7 also closes the contacts R7c in line 531 to maintain power in the line 654 when the drive head 355 is retracted and the limit switches LS2 or LS2A opened as a result thereof.

Simultaneously with the forming of the individual blades 17 by the die 50, and their insertion into the index head 15a, the end ring 22 and back plate 23 are being spun onto the blades 17 mounted on another index head 15c which has been positioned at the spinning station by the ferris wheel 10. The spinning operation starts when a back plate 23 has been inserted into the guide 382 and is properly positioned with respect to the aperture 444 so that the relay R9 is energized by completion of a circuit from line 536, through the transformer 700, the line 702, and the contacts 705 and 706 which are electrically connected by the back plate 23 when it is properly positioned. The relay R9 then closes the contacts R9a in line 537 to complete a circuit to the light bulb 708 thus giving visual indication that the back plate 23 is properly positioned.

The relay R9 also closes the normally open contacts R9b in line 538 to complete a circuit to the relay R10 through the line 656, the closed contacts 615f of switch 615, and the lines 710 and 538. The relay R10 then closes the normally open contacts R10a and R10b in lines 553 and 555, respectively, to complete a circuit from the line 710 to the coils 553c and 555c thus actuating the valves 925 and 926, respectively, and causing the right and left-hand spin head cylinders 408 to move the carriages 388 and their respective heads 380 and 383 into engagement with the index head 15c. When relay R10 is actuated, the normally closed contacts R10c and R10d in lines 572 and 574, respectively, are opened thus preventing energization of the mechanism for moving the spin carriages to their retracted positions.

It is preferable that the drive head 380 engage the index head 15c and lock it against rotation before the back plate head 383 moves the back plate 23 into engagement with the ends of the blades 17 on the index head 15c. Accordingly, the coil 577c in line 577 is energized through the now closed contacts R17h for actuating the two-way valve 930 so that the line 931 will be blocked thus limiting the flow to the left-hand cylinder 408 through the line 933.

At the same time the coil 576c in line 576 is not energized, since the normally closed contacts R17i have been opened by the relay R17 and the valve 935 does not block the line 936 so that the source of pressure P is connected to the right-hand cylinder 408 through both the lines 936 and 938 and thus the right-hand cylinder 408 moves forward at a faster rate and, as a result, positions the drive head 380 in operative engagement with the index head 15c in advance of the back plate head 383. When a counterclockwise blower is being produced, the valve 935 is actuated whereas the valve 930 remains in the open position so that the left-hand carriage 388 is advanced at a faster rate than the right-hand carriage.

After the drive head 380 engages the index head 15c, the back plate head 383 is moved through the aperture 444 in the guide 445 to pick up the back plate 23 in the manner described hereinbefore. The head 383 continues its movement to the right, as viewed in FIG. 22, until the back plate 23 engages the blades 17 and forces them longitudinally into contact with the end ring 22 (FIG. 28) so that the final relative positions between the blades 17, the end ring 22 and the back plate 23 are established.

When the carriages 388 with the associated heads 380 and 383 reach their advanced or forward positions, the switches LS4 and LS4a in line 542 (FIG. 33) are closed to actuate the relay R11 which in turn closes the contacts R11a in line 560 to energize the coil 560c. The coil 560c shifts the valve 940 upwardly, as viewed in FIG. 36, to allow pressurized air to enter the air cylinders 411 and extend the lock pins 410 to secure the carriages 388 in their advanced positions so that the blower wheel components are locked against relative axial movement in the position shown in FIG. 22.

When the lock pins 388 are extended, the limit switches LS8 and LS8A in line 543 are closed to complete a circuit to and energize the spin clutch and time delay relays R12 and TDR1. The spin clutch relay R12 immediately closes the contacts R12a in line 562 to complete a circuit through the normally open contacts M2c, which are closed when the spin motor 433 is running, to the coil 562c which shifts the valve 945 thus pressurizing the cylinder 946 to effect engagement of the spin clutch 435. The rotary movement of the spin motor 434 is thereby connected to the drive shafts 414 so that the drive and back plate heads 380 and 383 rotate the index head 15c at a relatively high rate of speed.

The time relay TDR1 delays a predetermined amount of time so that the index head 15c can be brought up to speed and then it closes the contacts TDR1a in line 563 completing a circuit to the coil 563c which shifts the valve 950 to the right, as viewed in FIG. 36, causing the pressurized fluid to be supplied to the spin cylinder 487 to raise the spin rolls 470 with respect to the index head 15c. As the spin rolls 470 move upwardly (see FIGS. 28 and 29) they deform the outer peripheral flanges 377 of the end ring 22 and back plate 23, respectively, around the upturned flanges 24 on the ends of the individual blades 17 to complete a blower wheel 25.

When the rolls 470 reach the uppermost limit of their travel so that the deformation of the flanges 377 is completed, the limit switch LS6 in line 544 is actuated to complete a circuit to the relays R13, R14, and TDR2. The normally closed contacts R13a in line 545 are immediately closed by the relay R13 to maintain a circuit to the relays R13, R14 and TDR2 after the spin rolls 470 commence movement to their retracted positions. The relay R13 also opens the normally closed contacts R13b in line 538 and breaks the circuit to the relay R10 thus deenergizing the coils 553c and 555c to shift the valves 925 and 926 back to the neutral position. The relay R13 opens the normally closed contacts R13c to deenergize the relay R11 to open the circuit in line 560 to the coil 560c causing the valve 940 to be returned to the position shown in FIG. 36 wherein the springs 946 retract the lock pins 410.

In addition, the relay R13 opens the contacts R13d in line 543 to deenergize the relays R12 and TDR1 which cause the contacts R12a in line 562 to open and deenergize the coil 562c which causes the valve 945 to be shifted to the vent position wherein the cylinder 946 is connected to the atmosphere so that the spring 947 effects the disengagement of the spin clutch 435. The contacts TDR1a in line 563 are also opened causing deenergization of the coil 563c and return of the valve 950 to its central position, and simultaneously the contacts R13e in line 565 are closed to supply current to the coil 565c which shifts the valve 950 to the right, as viewed in FIG. 36, causing the cylinder 487 to retract the spin rolls 470 to their lowered or inactive position.

The relay R14, which was actuated simultaneously with the relay R13, closes the normally open contacts R14a in line 570 to complete a circuit to the coil 571c through lines 570 and 571 having the normally open contacts R17j therein. The coil 571c then shifts the valve 960 downwardly causing the clockwise knockout cylinder 460 to be pressurized thereby shifting the rod 461 axially within the drive shaft 414 to engage the knockout screw 280 of the index head 15c. This action shifts the fixture 256 and rings 270 to the right to disengage one of the rings 270 from blades of the finished blower wheel so that the latter is substantially released from the index head 15c, as described above. If a counterclockwise wheel were being manufactured, the counterclockwise knockout cylinder 460 would be actuated by the coil 570c in line 570 and the valve 961 since the contacts R17j and R17k in lines 511 and 570 would remain in their normally opened and closed positions, respectively.

After a predetermined amount of time elapses, the time delay relay TDR2 is energized to close the contacts TDR2a in line 547 thus completing a circuit to the relay R15. A holding circuit to the relay R15 is completed immediately in line 546 by the closing of the contacts R15a to give assurance that the relay R15 will remain energized until power is cut off from line 710. The relay R15 also closes the normally open contacts R15b in line 541 to actuate the relay R10A which is "latched" to the relay R10 and therefore moves the contacts R10a–d to their alternate positions. Thus a circuit is completed to the coils 572c and 574c in lines 572 and 574 by closing the open contacts R10c and R10d, respectively. These coils then shift the valves 925 and 926 downwardly, as viewed in FIG. 36, to connect the source of pressurized fluid to the air lines 955 and 956 causing the cylinders 408 to move the right and left-hand spin carriages 488 to their retracted positions. The normally closed contacts R10c and R10d are placed in lines 572 and 574, respectively, for blocking energization of the coils 572c and 574c during the period when the coils 553c and 555c are energized so that the spin carriages 388 are being moved to their advanced positions.

Referring again to FIG. 31, the circuit to relay R3 will be opened once each of the index drive heads 355 and the spin carriages 488 reach their retracted position since the normally closed contacts LS3, LS3A, LS5 and LS5A in line 523 will be opened. That is, the circuit to relay R3 through line 645 is open since the relay R15 opens the normally closed contacts R15c in line 645 and the circuit through the line 523 is opened between the points 523a and 523b when each of the switches LS3, LS3A, LS5 and LS5A therein is opened by the positioning of the heads 355 and carriages 388 in their retracted positions. When the relay R3 is deenergized, the contacts R3d in line 655 are opened so that the remaining relays of the automatic system are also deenergized and the system returned to its starting position once again. Thus the operator removes the finished blower wheel from and places an end ring on the index head 15d at the operator station and then depresses the switches 620 in line 521 to start another automatic cycle.

While the above description has traced the production of a single blower wheel, it should be apparent that four blower wheels are simultaneously in various stages of production. The operator is required to perform only four unskilled operations during the production of each blower, that is, he must place the end ring 22 on the index head 15d, place a back plate 23 in the guide 382, depress the switches 620, and remove the finished blower wheel 25. However, one or all of these operations may be performed mechanically without departing from the scope of the invention.

If at any time during automatic operation of the system one of the emergency switches 585 in line 507 (FIG. 30) is depressed, or for any reason power is cut off, the various machine operations will be immediately stopped since the power will be cut off from the lines 507 and 508 and the various relays which control operation. After this occurs, and the trouble eliminated, the motors 27, 46, and 434 are again started and the reset switch 750 having contacts in lines 522 and 661 (FIG. 35) is depressed to restart the automatic operation at the precise point of termination.

Thus assuming the operation had been stopped during the indexing of the ferris wheel 10, depressing of the switch 750 will again complete the circuit to the relay R1 through the line 521, the switch LS10 which is in engagement with the contact 635a, the lines 635, 755 and 756. The relay R2 will be reenergized in the usual manner through the line 535 and 536 in this specific situation and the normally closed contacts R2c in line 760 will be open so that the reset circuitry cannot energize relay R3 at this particular time. Thereafter the system will continue to operate in the usual manner as described above.

Assuming now that the automatic operation was terminated during the blade manufacturing and spinning operations, it would be first necessary to reset relay R3 by depressing the switch 750 to complete a circuit through the lines 522, 760 and 523 to the relay R3. Since this reset switch 750 is closed only momentarily, the circuit to the relay R3 is maintained through the line 523 in the manner described above when the contacts R3b therein are closed.

After the relay R3 is reset, the switch 750 in line 661 is depressed to complete a circuit around the relay contacts R8a to energize the relay R8 through the lines 654, 655, 656, 661 and 650. The relay contacts R8b in line 664 and R8c in line 680 are then closed to return the relays R5, R6 and R7, as well as the press clutch 666 to the status existing prior to the emergency stop. Reclosing of the contacts R3d in line 655 also supplies power to the line 656 and 710 to restart the various spinning operations.

When the operations at the spinning station have progressed beyond the insertion of the lock pins 410 at the time the emergency stop is made, the pins 410 will be retracted since both the valve 940 and the lock pins 410 are spring returned. When the system is reset, the spinning operation proceeds to reinsert the pins and perform the subsequent spinning operation. Necessarily then, some of the spinning operation will be repeated. It should now be apparent that the reset switch 750 will reset the entire electrical system regardless of the operations being performed prior to the emergency stop.

*Manual operation*

By shifting the selector switch 615 (line 523) from the automatic position to its alternate or manual position, the electrical circuitry is automatically programmed for manual operation for use as required and primarily during set-up of the machine. Manual control of the press is attained by controlling energization of the clutch coil 666 by the three-position selector switch 740 (FIG. 32) and, either the push button switch 741 on the control panel P, or a similar switch 742 on the rear of the machine. The two-position selector switch 745 determines which of the switches 741 or 742 will initiate operation of the manual operation, and for purposes of this explanation it will be assumed that it is positioned as shown in FIG. 32 wherein the switch 742 is in control.

Figure 35:
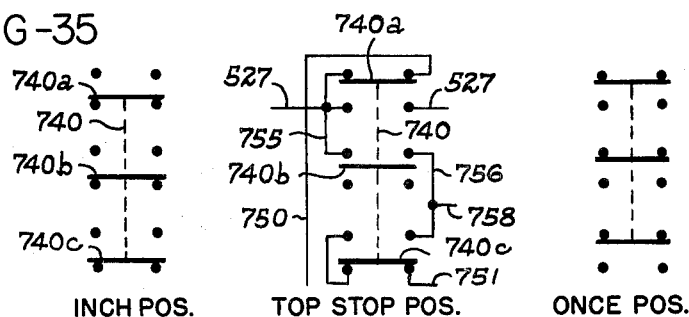

The three positions of switch 740 are shown in FIG. 35, and include an "inch" position wherein the press will move a short distance each time the switch 742 is depressed, a "top stop" position which causes the ram of the press 16 to stop at its top dead center each time the switch 742 is depressed, and a "once" position which causes the press to run through one complete stroke starting and ending at the top dead center of the press stroke.

Specifically, when the selector switch 740 is in the "inch" position, a circuit is complete to the relay R5 and press clutch coil 666 through the lines 525, 652, 527 and 530, and the contact 615c of the selector switch 615. Since the switch 742 remains closed only momentarily, this circuit opens immediately so that the coil 666 and the press clutch 48 are engaged only for a short period of time so that the ram 53 of the press 16 advances only a short distance.

When the switch 740 is moved to the "top stop" position and the switch 742 depressed, a circuit is completed to the clutch coil 666 through the contact 740a, line 750, contact 740c, and lines 751 and 668. The line 751 has the normally closed contacts R8d therein which eliminate the possibility of manual control of the press clutch 48 when the automatic system has energized the relay R8. The press now begins to run until this circuit is broken by the opening of the normally closed contacts R16c in line 751, which occurs when the press ram 53 reaches its top dead position, causing the switch LS1 in line 526 to be closed and the relay R16 to be energized. The relay R16 cannot be energized during the automatic operation when the relay R8 is energized and has opened the normally closed contacts R8e in line 526.

In the "once" position of the selector switch 740, with the press ram 53 at the top of its stroke, the closing of the switch 742 completes a circuit to the clutch coil 666 and relay R5 through the lines 527 and 755, contacts 740b, line 756, switch LS1 which engages contact 681a when the press ram is at the top of its stroke, and the lines 759 and 668. This circuit to the press clutch 666 is maintained subsequently through the line 760, 762, and 664 as a result of the closing of the normally open contacts R5a in line 762 by the relay R5.

Operation of the press 16 immediately shifts the switch LS1 into engagement with the contact 670a to energize relay R6 through line 670 and 672, and this circuit is then maintained through the lines 760 and 766, the now closed contacts R5b and R6d. The normally closed contacts R6e in line 759 are simultaneously opened by relay R6 so that current can be supplied to line 668 only through the line 664. When the press ram 53 reaches the top of its next stroke, the switch LS1 is moved back into contact with the contact 681a to complete a circuit to the relay R7 in line 681 having the now closed switch R6f therein. The relay R7 immediately opens the normally closed switch R7a in line 668 to break the circuit to the relay R5 and the clutch coil 666 to terminate operation of the press 16 with its ram 53 at the top of its stroke. The normally open contact R7f in line 765 is provided to insure proper operation of the system when the operator holds the switch 740 or 742 in the depressed or closed position.

If the selector switch 740 is shifted downwardly from the position shown in FIG. 32, it will program the circuitry for control by the switch 741 rather than switch 742. The switch 741 has contacts in parallel with the similar contacts of switch 742 and thus function in a substantially identical manner.

The clockwise and counterclockwise index heads 355 can also be moved manually by appropriately positioning the selector switch 770 having contacts in lines 550 and 552. Hence when it is desired to move one of the index drive heads 355 forward, the switch 770 is moved so that the contacts 770a will complete a circuit to the coil 548c or 550c depending on the status of the relays R17 and R19 as determined by the type of blower wheel being made. The normally closed relay contacts R4b are provided in line 550 to prohibit completion of a circuit therethrough during automatic operation.

In a similar manner the switch 770 can be moved to its alternate position to close the contacts 770b in line 552 to actuate one of the coils 551c or 552c depending again on the status of the relays R17 and R19. The normally closed contacts R7c are provided in line 552 to prohibit completion of the automatic system. Likewise, the selector switches 775, 776, and 778 are provided in lines 554, 556, and 561, respectively, to move the left and right spin carriages 388 forward, and the lock pins 410 into their locking positions. The normally closed relay contacts R11b in line 561 make actuation of the selector switch 778 ineffective when the relay R11 is energized during automatic operation of the system.

The selector switch 780 having contacts 780a and 780b in lines 564 and 567, respectively, is movable between alternate positions to effect upward movement of the spin roll 470. The lines 564 and 567 have the normally closed contacts TDR1b and R13f therein to prohibit manual energization of the coils 563c and 565c when the automatic system is in control. Similarly, the selector switches 783, 784, and 785 in lines 571, and 574 operate the knockout mechanism, and move the right and left-hand carriages 388 back, respectively. These lines have the normally closed relay contacts R14c, R15d, and R15e, respectively, for preventing manual operation when the system is being operated automatically.

During the manual operation of the machine, it is also possible to actuate the spinning mechanism in the automatic mode, as described above. For this purpose the selector switch 795 in line 538 is provided so that a circuit will be completed from the line 652 through the contacts 615g and 615h of the automatic-manual selector switch 615 to the line 710. Thus when switch 795 is closed power is supplied to the relays R10 through R15, TDR1 and TDR2 so that each step of the spinning operation is performed in the manner described above in connection with the automatic operation starting with the energization of the relay R9 and ending with the energization of the relay R15 and the operation effected thereby. Thus, the relay R10 in line 538 is actuated when the contacts R9b are closed, and from this point on the automatic spinning operation is effected. The manual selector switches 775, 776, 780, 784, and 785 must, of course, be in their automatic position in order to operate the system in this manner.

To summarize the operations required to change the machine from the production of clockwise to counterclockwise blower wheels, it is necessary to reverse the ferris wheel 10 so that the index heads 15 are on the right side thereof, and to reverse the drive and back plate heads 380 and 383 on the spin carriages 388. The carriages 388 must have their relative positions with respect to the support members 390 appropriately adjusted to accommodate cooperation between the associated head 380 or 383 and the index head 15c as described. Likewise, the position of the back plate guide 382 must be moved so that it cooperates with the head 383, and the selector switch 610 in line 518 must be appropriately positioned so that the electrical and pneumatic systems will be suitably programmed. It should be apparent that the changeover time will be held to a minimum when changing from the production of clockwise to counterclockwise blower wheels, and vice versa.

While a pneumatic control system is shown and described in the preferred embodiment, it is within the scope of this invention to use a liquid in place of air and to substitute the numerous equivalents for each of the elements in this system. Similarly, the electrical circuitry can be modified by substitution of equivalents so long as the above described requisite functions are substantially maintained.

While the method herein described, the forms of apparatus for carrying this method into effect, and the product or article produced by the aforesaid method and apparatus, constitute preferred embodiments of the invention, it is to be understood that the invention is not limited to this precise method and form of apparatus, and that changes may be made in either without departing from the scope of the invention which is defined in the appended claims.

What is claimed is:

1. Apparatus of the character described for manufacturing blower wheels having a plurality of individual blades held rigidly between an end ring and a back plate, comprising frame means, die means for forming the individual blades from sheet metal stock, fixture means on said frame means for receiving and holding the blades in a predetermined relationship corresponding to the spacing blades in the blower wheel, means on said frame means for transferring each blade from said die means to said fixture means, spinning means on said frame means for securing the end ring and back plate to opposite ends of the blades, and means for moving said fixture means from cooperation with said die means into cooperation with said spinning means when said fixture means has the plurality of blades thereon.

2. Apparatus of the character described for manufacturing blower wheels having a plurality of individual blades held rigidly between an end ring and a back plate, comprising frame means, die means on said frame means for forming the individual blades from sheet metal stock, index head means on said frame means having blade fixture means thereon for receiving and holding the blades in a predetermined relationship corresponding to the spacing blades in the blower wheel, transfer means on said frame means for transferring each blade from said die means to said fixture means, motor means for positioning said index head means so that said blade fixture means are aligned to receive each blade from said transfer means, means associated with said motor means for terminating operation of said die means and said transfer means when said blade fixture has a predetermined number of blades thereon corresponding to the number of blades in the blower wheel, and spinning means on said frame means operable when said fixture means is filled with blades for securing the end ring and back plate to opposite ends of the blades.

3. Apparatus of the character described for manufacturing blower wheels having a plurality of individual blades held rigidly between an end ring and a back plate, comprising a frame means, fixture means on said frame for receiving and holding the end ring and for receiving and holding the blades in a predetermined circumferential relationship spaced corresponding to their circumferential relation in the blower wheel with one end of each of the blades spaced from the end ring, and spinning means on said frame means operable when said fixture means has thereon the plurality of blades for moving the back plate into engagement with the opposite ends of the blades and forcing the back plate and the blades in an axial direction until the blades contact the end ring and connect the end ring and back plate to the ends of the blades.

4. Apparatus of the character described for manufacturing blower wheels having a plurality of individual blades held rigidly between an end ring and a back plate, comprising a frame, a support arm having index head means rotatably mounted thereon, said index head means having blade fixture means thereon on one side of said arm for receiving and holding the blades in a predetermined spaced relationship corresponding to their relationship in the blower wheel, latch means on said index head means for holding the end ring between said arm and said blade fixture means in aligned relationship with first ends of the blades, said index head means having a drive connection on the opposite side of said support arm, identical spin carriages on said frame on opposite sides of said head means, a first of said carriages having a drive head thereon for engaging said drive connection and rotating said index head means when said carriage is in an advanced position, a second of said carriages having a back plate head thereon for moving the back plate into engagement with the opposite ends of the blades and the first ends of the blades into contact with the end ring when said second carriage is in an advanced position, means for moving said carriages to and from said advanced positions, and means on said frame for deforming an outer flange on the end ring and back plate over the ends of the blades for creating a rigid connection therebetween.

5. Apparatus of the character described for manufacturing blower wheels having a plurality of individual blades held rigidly between an end ring and a back plate, comprising frame means a support arm having index head means rotatably mounted thereon, said head means having blade fixture means thereon on one side of said arm for receiving and holding the blades in a predetermined spaced relationship corresponding to their relationship in the blower wheel, latch means on said head means for holding the end ring between said arm and said blade fixture means in aligned relationship with first ends of the blades, a drive connection on said head means for rotating the same, guide means on said frame means for guiding the back plate into alignment with the opposite end of the blades, identical spin carriages on said frame means on opposite sides of said head means, a first of said carriages having a drive head thereon for engaging said drive connection for rotating said head means, a second of said carriages having a back plate head thereon for moving the back plate from said guide into engagement with the opposite ends of the blades and for forcing the blades in an axial direction so that the first ends thereof contact the end ring, means for moving said first carriage and its associated drive head into engagement with said index head means prior to movement of said second carriage and its associated back plate head into engagement with the opposite ends of the blades, and means for deforming an outer flange on the end ring and back plate over the ends of the blades for creating a rigid connection therebetween.

6. Apparatus of the character described for manufacturing sheet metal blower wheels having a plurality of individual blades held rigidly between an end ring and a back plate, comprising a machine frame, a fixture support member rotatably mounted on said frame having a plurality of arms thereon each with fixture means on the outermost end thereof, a plurality of fixture means on said support member disposed parallel to the axis of rotation of said fixture support member and operable to receive and hold a predetermined number of the blades in a spaced relationship corresponding to their relationship in the blower wheel, spinning means for securing the end ring and back plate on opposite ends of the blades, and means for rotating said fixture support member to position sequentially each said fixture means for cooperation with said spinning means.

7. Apparatus of the character described for manufacturing blower wheels having a plurality of individual blades held rigidly between an end ring and a back plate; comprising a machine frame; a fixture support member rotatably mounted on said frame having at least three arms thereon each with fixture means thereon; each said fixture means being operable to receive and hold a plurality of the blades in a predetermined spaced relationship corresponding to their relationship in the blower wheel; transfer means for transferring the individual blades to said fixture means; spinning means for securing the end ring and back plate on opposite ends of the blades; said arms on said fixture support member being arranged symmetrically so that when one of said fixture means is positioned in a first position for receiving blades from said transfer means, another of said fixture means is positioned in a second position for cooperating with the said spinning means to place the end ring and back plate on the individual blades, and a third of said fixture means is positioned in a third position wherein the finished blower wheel is removed therefrom; and means for rotating said fixture support member so that said fixture means move through said first, second and third positions.

8. Apparatus of the character described for manufacturing blower wheels having a predetermined number of individual blades held rigidly between an end ring and a back plate, comprising a machine frame having a fixture support member rotatably mounted thereon, at least two arms on said support member each with fixture means thereon, each said fixture means being movable to a blade receiving position for receiving and holding the predetermined number of blades in a spaced relationship corresponding to their relationship in the blower wheel, transfer means for transferring the blades to said fixture means when in said blade receiving position, spinning means for securing the end ring and back plate on opposite ends of the blades when said fixture means is in a spinning position, said arms on said fixture support members being arranged so that when one of said fixture means is receiving blades from said transfer means another is cooperating with the said spinning means to secure the end ring and back plate to the individual blades, and means for rotating said fixture support member to position sequentially each said fixture means in said blade receiving position and said spinning position.

9. Apparatus of the character described in claim 8 wherein a drive mechanism is provided for engaging and rotating said fixture means when in said blade receiving position, said mechanism including a drive shaft rotatably mounted in said frame and driven in correlation with said transfer means, a pinion having elongated teeth mounted on one end of said drive shaft, a carriage mounted on said frame for reciprocal movement parallel to said pinion and having a gear rotatably mounted thereon which drivingly engages said teeth, a drive head mounted on said carriage and driven by said gear for driving engagement with said fixture means, and means for moving said carriage between an engaged position wherein said drive head engages said fixture means and a retracted position wherein said drive head is spaced from said fixture means, and means for insuring engagement between said drive head and said fixture means regardless of their relative angular positions.

10. Apparatus of the character described for manufacturing blower wheels having a plurality of individual blades held rigidly between an end ring and a back plate, comprising a machine frame, a fixture support member rotatably mounted on said frame and having a plurality of symmetrically positioned arms thereon, a blade receiving fixture mounted on one side of each of said arms with the axes of said fixture being parallel to the axis of rotation of said support member, each of said fixtures having means thereon for receiving and holding the blades in a predetermined relationship corresponding to the spacing of the blades in the blower wheel, a drive connection on each of said fixtures positioned on the other side of said arm for rotating the arm, means for rotating said support member so that said arms are sequentially positioned in a blade receiving position, transfer means for transferring the blades to said fixture when the same is in said blade receiving position, drive means on each side of said transfer means for engaging said drive connection and rotating said fixture means in correlation with the operation of said transfer means, said fixture being reversible with respect to said transfer means so that said fixture may be positioned on the opposite side of said arms, and means for selecting the appropriate drive means for engaging said drive connection depending on which side of said arms said fixture means are mounted.

11. Apparatus of the character described for manufacturing blower wheels having a plurality of individual blades held rigidly between an end ring and a back plate, comprising a frame, index head means on said frame for receiving and holding the blades in a predetermined spaced relationship corresponding to their relationship in the blower wheel, means on said index head means for holding the end ring in aligned relationship with first ends of the blades, a drive head on said frame for rotating said head means, a back plate head on said frame for carrying the back plate into engagement with the opposite ends of said blades and for forcing the blades in an axial direction so that the first ends thereof contact said end ring, means on said frame for deforming an outer flange on the end ring and back plate over the ends of the blades for rigidly interconnecting these members, and knockout means for releasing the finished blower wheel from said head means.

12. Apparatus of the character described for manufacturing blower wheels having a predetermined number of individual blades held rigidly between an end ring and a back plate, comprising machine frame means, an index head on said frame means including a body member supported for rotation and having means on one side thereof for receiving and releasably holding the end ring, a blade fixture mounted on said one side of said body member for receiving and holding thereon a plurality of blades in predetermined spaced relationship corresponding to the blade spacing in the finished blower wheel and with the ends of the blades being aligned with and spaced from the end ring, said blade fixture being axially movable with respect to said body member so that the end of the blades can be moved into engagement with the end ring, means for placing a back plate in engagement with the other end of the blades and for forcing the one end of the blades into engagement with the end ring, drive means on said frame means for rotating said index head together with the back plate and end ring, and deforming means on said frame means for bending an outer peripheral flange of the back plate and end ring over the ends of the individual blade.

13. Apparatus of the character described for manufacturing blower wheels, comprising a frame, fixture means on said frame for receiving and holding a plurality of blower wheel blades in a predetermined spaced relationship corresponding to their relationship in the blower wheel, a guide on said frame for guiding a back plate into alignment with the opposite ends of the blades, said guide including an elongated base plate with an aperture therein which has a diameter smaller than the outer diameter of the back plate, guide rails on said frame on opposite sides of said base plate for receiving and guiding movement of the back plate along said plate into alignment with said aperture, said rails being cut away in the area of the said aperture for permitting said back plate to move outwardly from said guide in a direction away from said aperture, latch means for holding the back plate in alignment with said aperture against said outward movement, said latch means being releasable when a predetermined force is exerted on the back plate toward said outward movement, a back plate head on said frame being movable through said aperture to exert said predetermined force on the back plate and carry the same from said guide into engagement with the ends of the blades, and means for prohibiting movement of said back plate head and until the back plate is aligned with said aperture.

14. Apparatus of the character described for manufacturing blower wheels having a predetermined number of individual blades held rigidly between an end ring and a back plate, comprising frame means, an index head having a fixture reciprocally supported thereon, said head being adapted to receive and hold the end ring, at least three support rings mounted on said fixture with their outer peripheral edges extending radially outwardly therefrom for receiving and holding the predetermined number of blades, a plurality of equally spaced first slots in said edges of at least two of said support rings for receiving the leading edge of the individual blades, another of said rings having second slots offset with respect to said first slots in the other of said support rings for clamping the blades between the one side of said first slots and the opposite side of said second slots, means for moving said fixture and said support rings in an axial direction toward said head to move said blades into contact with the end ring, means for securing the end ring and back plate to opposite ends of the blades, and knockout means on said frame means for moving said fixture an additional distance toward said head so that at least one of said support rings is moved axially from contact with the blades for releasing the blower wheel from said head.

15. Apparatus for handling individual blower wheel blades having smoothly curved blade surfaces, a flange extending outwardly and to the rear from each end of the blade surface, and an upturned edge on the outer portion of the flange, comprising horizontal track means for receiving the upturned edges for guiding movement of each individual blade, vertical track means positioned below and aligned with a forward portion of said vertical track means, means for moving each individual blade into said horizontal track means and to the forward end thereof, said forward portion of said horizontal track having a relieved lower track guide above said vertical track for permitting said blade to be forced downwardly into said vertical track, transfer means for moving the blade from said forward portion into said vertical track, said transfer means and said vertical track means cooperating to prevent angular rotation of the blade as the same moves through said vertical track, and biasing means applying a pressure on said forward portion and said vertical track for resisting blade movement when in the forward portion or the vertical track.

16. Apparatus of the character described for manufacturing blower wheels having a predetermined number of individual blades held rigidly between end ring means disposed on the opposite end of said blades comprising, a frame, die means on said frame for forming a predetermined number of the individual blades from sheet metal stock, fixture means on said frame for receiving said blades from said die means and for holding the blades in a predetermined relationship corresponding to the spacing of the blades in the blower wheel, means on said frame for automatically transferring each blade from said die means to said fixture means, and spinning means on said frame for securing the end ring means to opposite ends of the blades when said fixture means has thereon said predetermined number of blades.

References Cited by the Examiner

UNITED STATES PATENTS

| | | | |
|---|---|---|---|
| 942,680 | 12/1909 | Takacs | 153—2 |
| 1,008,940 | 11/1911 | Best | 153—2 |
| 2,135,040 | 11/1938 | Morgan | 78—53 |
| 2,143,463 | 1/1939 | Allard | 29—23.5 |
| 2,651,830 | 9/1953 | Wilken et al. | 29—23.5 |
| 2,980,990 | 4/1961 | Sprouse | 29—156.8 |
| 2,996,788 | 8/1961 | Austin et al. | 29—23.5 |
| 3,010,187 | 11/1961 | Glasson | 29—156.8 |

RICHARD H. EANES, JR., *Primary Examiner.*

D. M. SCHMIDT, *Assistant Examiner.*